United States Patent
Syed et al.

(10) Patent No.: US 9,942,749 B2
(45) Date of Patent: Apr. 10, 2018

(54) METHODS AND APPARATUS FOR MANAGING AND/OR CONFIGURING BASE STATIONS WHICH INCLUDE SENSORS

(71) Applicant: Time Warner Cable Enterprises LLC, New York, NY (US)

(72) Inventors: Zaheer Syed, Ashburn, VA (US); Praveen Srivastava, Ashburn, VA (US); Rajesh Gangadhar, Ashburn, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 14/923,130

(22) Filed: Oct. 26, 2015

(65) Prior Publication Data

US 2017/0118629 A1    Apr. 27, 2017

(51) Int. Cl.
  *H04W 8/22*    (2009.01)
  *H04W 4/02*    (2018.01)
  *G08B 21/04*   (2006.01)
  *G01C 5/06*    (2006.01)
  *H04W 4/04*    (2009.01)

(52) U.S. Cl.
  CPC .............. *H04W 8/22* (2013.01); *H04W 4/026* (2013.01); *G01C 5/06* (2013.01); *G08B 21/0438* (2013.01); *G08B 21/0446* (2013.01); *H04W 4/043* (2013.01)

(58) Field of Classification Search
  CPC ............ H04Q 1/125; H04Q 3/02; H04Q 3/04; H04Q 1/3233; H04Q 23/00; H04Q 1/246; H04Q 3/08; H04W 16/28; H04W 24/02; H04W 88/08; H04W 24/00; H04W 24/04; H04W 4/02; H04W 4/026; H04W 4/043; H04W 4/025; H04W 8/22; G01C 21/20; G01C 5/06; G08B 21/0446; G08B 21/0438
  USPC ................................ 342/359; 455/561, 562.1
  See application file for complete search history.

(56) References Cited

U.S. PATENT DOCUMENTS

| 3,739,364 | A  | * | 6/1973  | Talkington | ............... G06G 7/20 33/366.11 |
| 6,239,744 | B1 | * | 5/2001  | Singer     | .................... H01Q 1/246 342/359 |
| 6,897,828 | B2 | * | 5/2005  | Boucher    | ............... H01Q 1/125 343/757 |
| 7,280,195 | B2 | * | 10/2007 | Yoon       | ..................... H04W 16/18 356/139.1 |
| 8,299,962 | B2 | * | 10/2012 | Le Sage    | ................. H01Q 1/125 342/359 |

(Continued)

*Primary Examiner* — Olumide T Ajibade Akonai
(74) *Attorney, Agent, or Firm* — Straub & Straub; Michael P. Straub; Stephen T. Straub

(57) ABSTRACT

Sensor based information from a base station is received by a configuration management device and is used to determine orientation, altitude and/or location. In some embodiments, the configuration management device compares measurement based information to corresponding expected values in a deployment plan to determine whether or not the base station has been correctly deployed. In some embodiments, the configuration management device uses received sensor based information from a base station to control re-configuration of the base station, e.g., re-orient an antenna or change an antenna pattern.

18 Claims, 12 Drawing Sheets

(56) References Cited

U.S. PATENT DOCUMENTS

| | | | |
|---|---|---|---|
| 2007/0063911 A1* | 3/2007 | Davidson | H01Q 1/246 343/810 |
| 2009/0233645 A1* | 9/2009 | Takamatsu | H01Q 1/125 455/561 |
| 2012/0218159 A1* | 8/2012 | Ke | H01Q 3/08 343/760 |
| 2013/0301539 A1* | 11/2013 | Aguirre | H04W 16/00 370/329 |
| 2015/0119087 A1* | 4/2015 | Lee | H04W 4/043 455/457 |

* cited by examiner

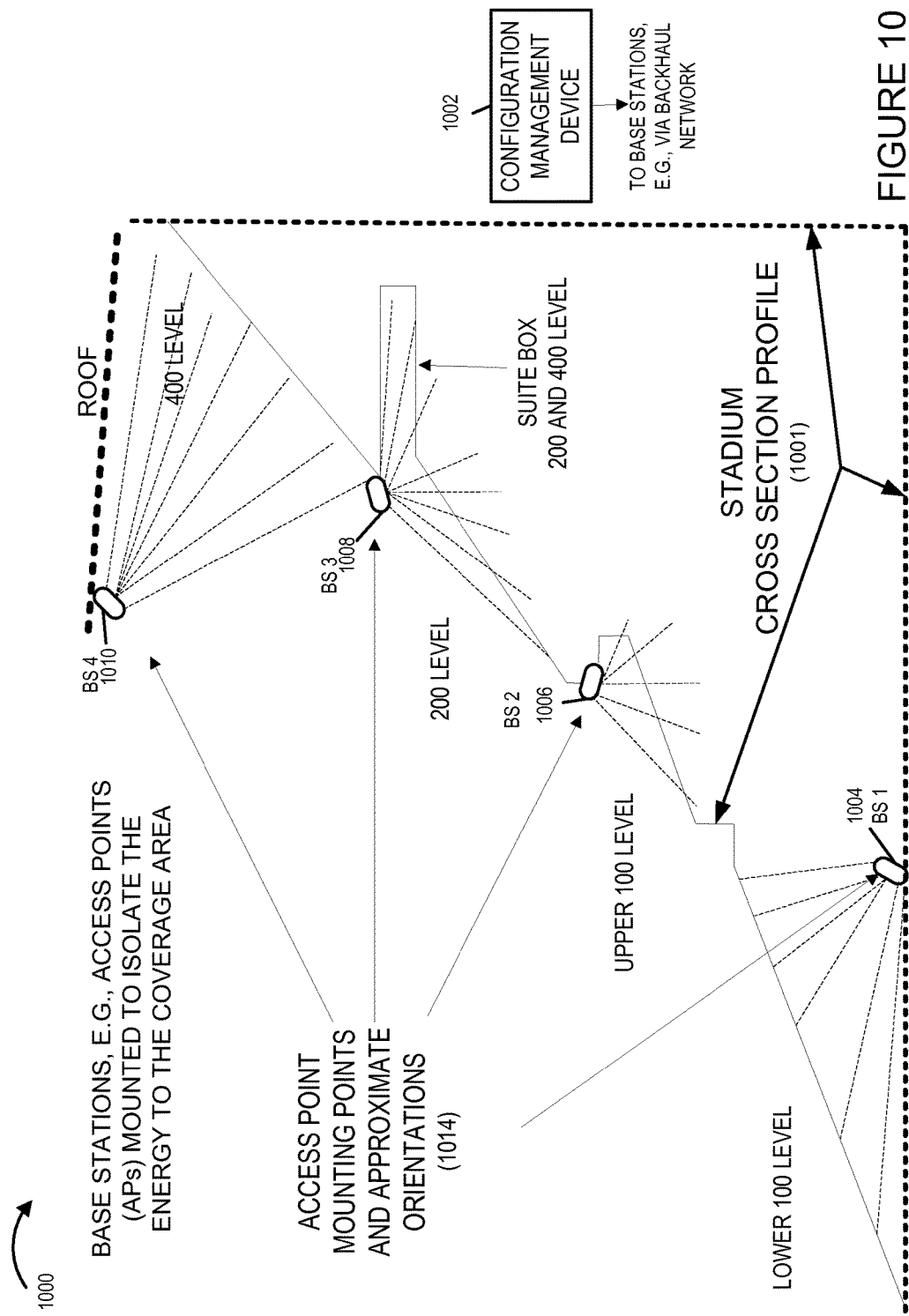

METHODS AND APPARATUS FOR MANAGING AND/OR CONFIGURING BASE STATIONS WHICH INCLUDE SENSORS

FIELD

Various embodiments relate to methods and apparatus for managing and/or controlling base stations, and more particularly to evaluating a base station installation as part of a management operation and/or controlling a deployed base station as part of system optimization.

BACKGROUND

There is an ever increasing demand for wireless communications air link resources as more devices include wireless interfaces, new types of information are being communicated wirelessly, and users desire to be able to have wireless access at any location. In response to this increasing demand for wireless communications resources, service providers are moving toward high density deployments of base stations. For example, many small cell base stations are being added by service providers at outdoor locations to supplement large cell base stations.

High density deployments of base stations may require at least some base stations to be deployed with directional antennas to isolate interference as a means to improve signal to noise ratio (SNR), which in turn translates into better user experience for voice and video application. Typically, when a system is designed which includes base stations in a high density deployment, each base station and/or base station antenna is designed to be mounted at a specific location with a specific mounting orientation, e.g., a specific down tilt and azimuth (direction). The system provider typically relies on construction teams to install the base station at the correct location, to mount the base station in the correct orientation, and to provide feedback via pictures and/or comments. This information supplied by the construction team needs to be stored, maintained and over time updated with changes.

One problem with the current approach of deploying new base stations is that there is no low cost effective way to ensure that a deployment of a base station is effective, accurate and devoid of errors. It may be difficult to verify via pictures that the mounting orientation is correct within the deployment plan tolerances. It would be costly and time consuming to have to send out an evaluation team to verify that each installed base station was correctly deployed in accordance with the deployment plan. Many of these deployed base stations may not be easily accessible, e.g., because of mounting height, to access directly, and it may involve extensive test measurements to map the coverage area of each base station via ground measurements with a communications device and then evaluate the deployment installation status indirectly. In addition, an incorrectly deployed base station may interfere with other base stations in the same region. In situations where multiple new base stations are deployed concurrently it may not be obvious as to which one of the newly deployed was incorrectly installed.

Based on the above discussion there is a need for new methods and apparatus to evaluate base station installations and/or to control base station configuration.

SUMMARY

An installed base station, e.g., a newly installed WiFi base station, includes a set of sensors which may be used to perform measurements to evaluate position, orientation and/or altitude. In some embodiments, the set of sensors, e.g., 3 accelerometers, 3 gyroscopes, a pressure sensor, a magnetic sensor and a GPS receiver, are included in one or more Micro Electro Mechanical Systems (MEMS) chips. Sensor based information from the base station is received by a configuration management device and is used to determine orientation, altitude and/or location. The configuration management device compares measurement based base station and/or base station antenna orientation, attitude and/or location to corresponding expected values in a deployment plan to determine whether or not the base station has been correctly deployed. In some embodiments, the configuration management device takes corrective action in response to a determination of an unacceptable installation. Exemplary corrective actions include: sending a command to the base station to change an antenna pattern, sending a command to move one or more motors in the base station to re-orient the base station or base station antenna, or sending an automatic message to an installation team informing the team of the unacceptable installation and including information identifying the problem.

In some embodiments, at least some base stations include one or more motors for re-orienting and/or repositioning the base station or the base station's antenna. In some such embodiments, the configuration management device makes ongoing configuration determinations, based on sensor measurement information, schedule information, and/or user information, e.g., usage statistics in an area indicating the number of users in a base station coverage area. Based on a configuration determination, the configuration management device moves or re-orients a base station or base station antenna, e.g., as part of system optimization.

An exemplary method of operating a configuration management device, in accordance with some embodiments, includes receiving from a base station, at the configuration management device, sensor based information including at least of: i) a pressure sensor measurement; ii) an accelerometer measurement; iii) a height based on a pressure sensor measurement; or iv) orientation information based on an accelerator measurement; and making a configuration determination based on the received sensor based information.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE FIGURES

FIG. 10 is a drawing illustrating a system including an exemplary configuration management device and a plurality of base stations with different mounting positions and orientations in accordance with an exemplary embodiment.

DETAILED DESCRIPTION

Figure 1:
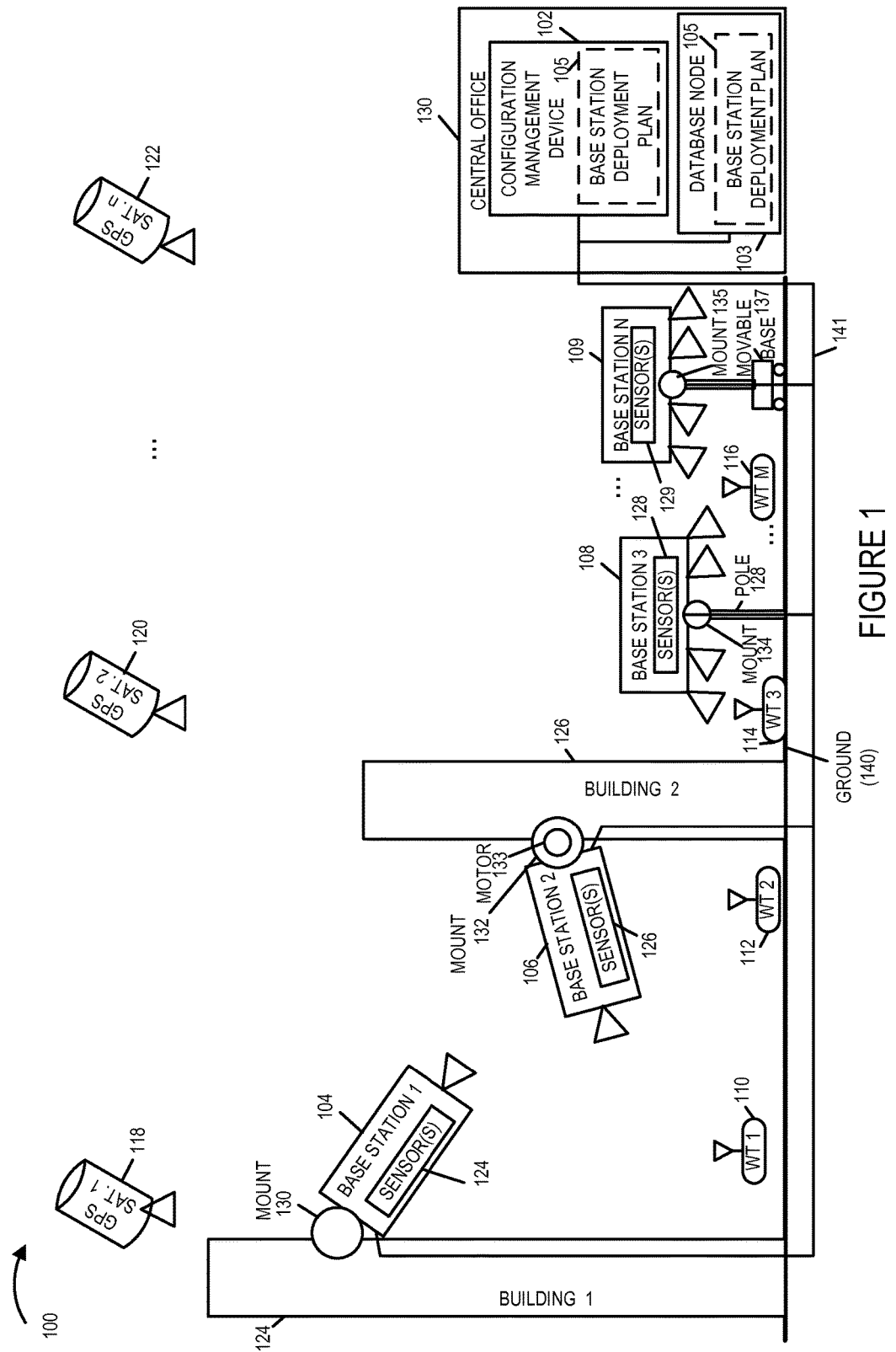
FIG. 1 is a drawing of an exemplary communications system in accordance with various exemplary embodiments.

FIG. 1 is a drawing of an exemplary communications system in accordance with various exemplary embodiments. Exemplary communications system 100 includes a configuration management device 102, a plurality of base stations (base station 1 104, base station 2 106, base station 2 108, . . . , base station N 109), each of the base stations including sensor(s) (124, 126, 128, . . . , 129) respectively. Exemplary sensors include, e.g., accelerometers, gyroscopes, pressure sensors, magnetic field strength sensors, GPS sensors, etc. Exemplary system 100 further includes a plurality of wireless communications devices (WT 1 110, WT2 112, WT 3 114, WT M 116). The sensor(s) perform measurements which facilitate base station and/or base station antenna position, altitude, and/or orientation information to be determined, e.g., by the configuration management device. Determined base station and/or base station antenna position, altitude and/or orientation information is used by the configuration management device 105 to evaluate deployment of a base station in accordance with a deployment plan to determine whether or not the base station is properly deployed and/or to take corrective action, e.g., following initial installation of a new base station, and/or for a re-evaluation of the base stations in an existing system, e.g., following a storm in which the base station was subjected to high winds.

In some embodiments, the sensor(s) included in the base station allow for the base station and/or base station antenna position, altitude and/or orientation to be controlled, e.g., changed, in a real time or near real time manner, e.g., in response to a predetermined schedule and/or in response to expected or detected changes in the number and location of people in a given area including potential wireless coverage areas of the base station.

Exemplary base station 1 104 is attached to building 1 124 via mount 130, e.g., a fixed mount which is attached to the building set and locked in a particular orientation. Exemplary base station 2 106 is attached to building 2 126 via mount 132, which is fixed to the building and set to selected orientation. Base station 2 106 includes a motor 133 which allows the orientation to be adjusted under the control of the configuration management device 102. Exemplary base station 3 108 is installed on the top of a pole 128 via mount 134, which may be adjusted, e.g., leveled and rotated, and then locked to achieve a particular orientation and heading. Exemplary base station 108 includes a plurality of antennas and different sets of antennas may be used at different times, e.g., under control of the configuration management device. Exemplary base station N 109 is a moveable base station including a moveable base 137 and an adjustable mount 135. Exemplary base station 109 includes a plurality of antennas which may be selectable controlled under the direction of configuration management device 102.

One or more or all of the base stations (104, 106, 108, . . . , 109) include a GPS sensor, e.g., a GPS receiver, and may receive GPS signals from one or more of GPS satellites (GPS satellite 1 118, GPS satellite 2 120, . . . , GPS satellite n 122), e.g., allowing a GPS position and/or GPS altitude fix to be obtained.

The configuration management device 102 uses a base station deployment plan 105, which may be included in the configuration management device 102 or stored in a database node 105, which is coupled to the configuration management device 102. The configuration management device is coupled to the base stations (104, 106, 108, . . . , 109), via a backhaul network 141.

The different exemplary base stations (104, 106, 108, 109) may be, and in some embodiments, are, mounted at different heights from the ground 140. The deployed height for a base station and/or base station antenna is determined using GPS information and/or pressure sensor measurement information. At least some of the base stations (104, 106, 108, 109) are mounted with different base station and/or base station antenna orientations. Tilt is measured using accelerometers. Mounting heading and/or antenna heading is measured using gyroscopes and/or magnetic heading sensors. Base station and/or base station antenna position is measured using GPS sensors, e.g., GPS receivers.

In some embodiments, system 100 includes other types of base stations, e.g., base stations installed on moveable objects, e.g., a lifeguard chair, cable mounted base stations and base stations mounted on moving devices, e.g., moveable robotic base stations, which are controlled under the direction of the configuration management device 102.

Figure 2:
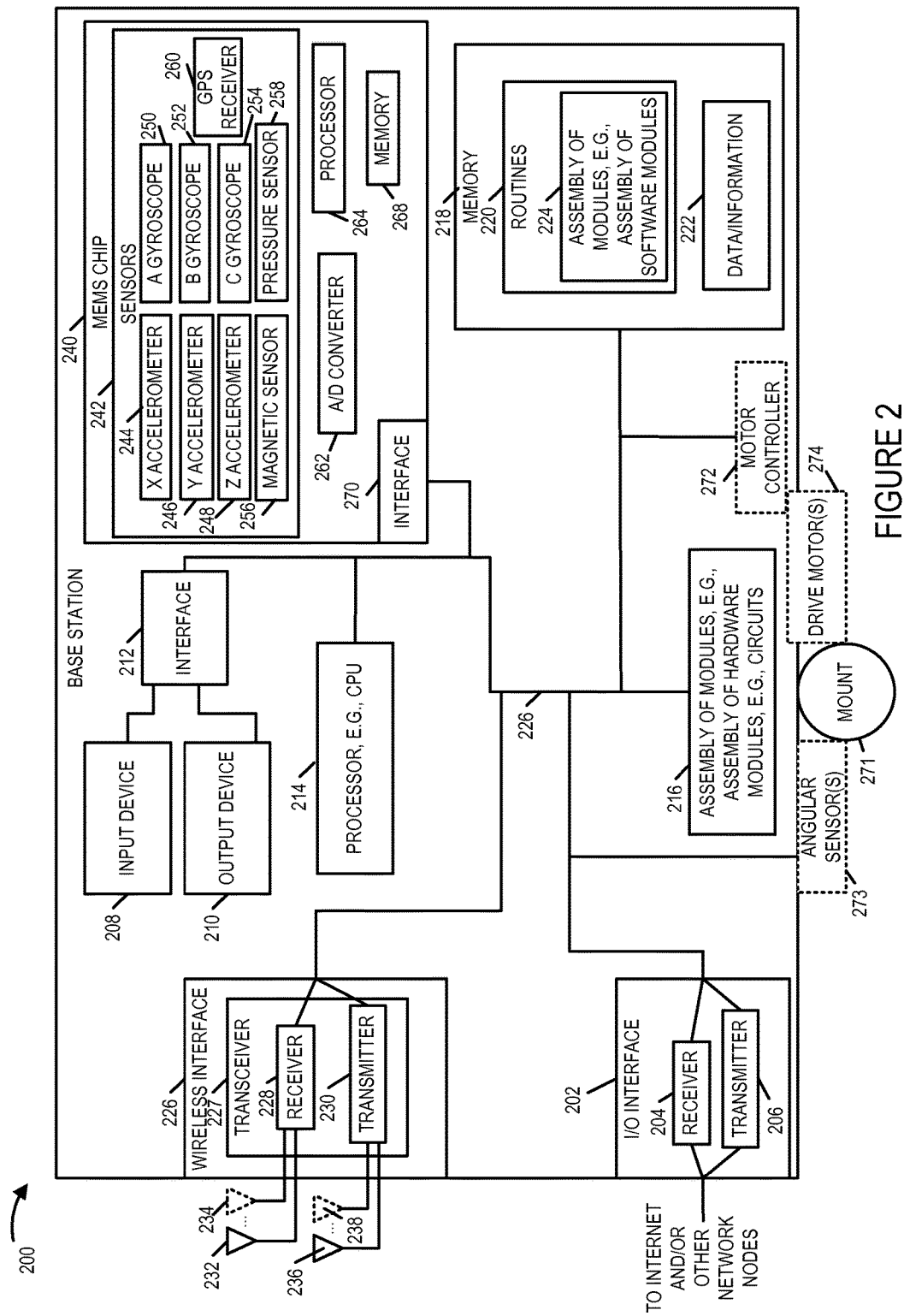
FIG. 2 is a drawing of an exemplary base station in accordance with various embodiments.

FIG. 2 is a drawing of an exemplary base station 200 in accordance with various embodiments. Exemplary base station 200 is, e.g., any of base stations (104, 106, 108, . . . , 109) of system 100 of FIG. 1. Exemplary base station 200 may be an outdoor or indoor base station. Exemplary base station 200 is, e.g., one of a WiFi base station, a small cell base station, a micro cell base station, a pico cell base station, or a femto base station. Exemplary base station 200 is, e.g., a base station mounted on a building, a base station mounted on a stadium, a base station mounted on a pole, e.g., a telephone pole or a light pole, a base station mounted on a cable, a base station mounted on a moveable base, a base station mounted on vehicle, a base station mounted on a chair, e.g., a lifeguard chair, etc.

Base station 200 includes an I/O interface 202, an input device, 208, an output device 210, an interface 212, a processor 214, e.g., a CPU, and assembly of modules 216, e.g., an assembly of hardware modules, e.g., circuits, memory 218, a wireless interface 226, and a MEMS chip 240. I/O interface 202, interface 212, processor 214, assembly of modules 216, memory 218, wireless interface 226, and MEMS chip 240 are coupled together via a bus 226 over which the various elements may interchange data and information. Input device 208, is e.g., keyboard, mouse, etc., and output device 210 is, e.g., a display. Input device 208 and output device 210 are coupled to interface 212, via which the devices (208, 210) are coupled to bus 226.

I/O interface 202 includes a receiver 204 and a transmitter 206. The I/O interface 202 couples the base station 200 to the Internet and/or other network nodes. Memory 218 includes routines 220 and data/information 222. Routine 220 includes an assembly of modules 224, e.g., an assembly of software modules. In some embodiments data/information 222 includes a base station deployment plan corresponding to a plurality of base stations. Processor 214 uses the routines 224 to control the operation of the base station 200. In some embodiments, at least some of the operations of the base station are performed and/or controlled by assembly of module 216.

Wireless interface 226 includes a transceiver 227 including a receiver 226 and a transmitter 230. The transceiver is coupled to at least one antenna. In some embodiments, the same antenna is used for receive and transmit. In some embodiments, different antennas are used for receive and transmit. Receiver 228 is coupled to one or more antennas (232, . . . , 234) via which the base station 200 may receive wireless signals from wireless terminals, e.g., user equipment (UE) devices. Transmitter 230 is coupled to one or more antenna (236, . . . , 238) via which the base station 200 may transmit wireless signals to wireless terminals. In some embodiments, the antenna(s) (232, . . . , 234, 236, . . . , 238) are part of the base station unit, e.g., the antennas are fixed to the base station housing, and moving the base station moves the antenna(s), e.g., re-orienting the base station via its mounting 271 re-orients the antenna(s).

Base station 200 further includes a base station mount 271. In some embodiments, base station 200 further includes one or more drive motors 274 for moving, e.g., repositioning the base station, one or more angular sensors 273 for sensing rotary position, and a motor controller 272 for controlling the base station motor(s) 274 to move, e.g., re-orient, the base station, e.g., under the direction of a configuration management device. In some embodiments, the base station includes three angular sensors, e.g., accurate to within a degree, and three corresponding drive motors, which can be controlled in a closed loop control operation, e.g. under the direction of a configuration management device.

Exemplary MEMS chip 240 includes a set of sensors 242 for performing measurements, an A/D convertor 262 for converting analog output from one or more sensors into a digital format, a processor 264, e.g., a CPU, a memory 268 and an I/O interface 270. Sensors 242 include three accelerometers (X accelerometer 244, Y accelerometer 246, Z accelerometer 248), three gyroscopes (A gyroscope 250, B gyroscope 252, and C gyroscope 254), a magnetic sensor 256, e.g., a magnetometer, a pressure sensor 258, and a GPS receiver 260. In various embodiments, the accelerometers (244, 246, 248) are substantially orthogonal to one another. In various embodiments, the gyroscope (250, 252, 254) measurement axes are substantially orthogonal to one another. In some embodiments, the gyroscopes are substantially aligned with respect to the accelerometers. The accelerometers (244, 248, 256) measure acceleration and can be used to measure tilt, e.g., with respect to a local vertical based on the local gravity value. The gyroscopes (250, 252, 254) measure angular rate and can be used in determining an orientation based on the earth's rotational rate and the location. Pressure sensor 258 measures barometric pressure and can be used to determine height. GPS receiver 260 receives GPS signals and can be used to determine location, altitude and/or velocity. Processor 264, e.g., a CPU controls the operation of the MEMS chip 240, e.g., to control the sensors to perform measurements and to output measurement data, to operate the A/D convertor 262, to process measurement data, and/or to operate the interface 270. Memory 268 includes routines used by the processor 264, sensor measurement information, processed sensor measurement information, and control information. I/O interface 270 couples the MEMS chip 240 to bus 262.

In some embodiments, different sensors 242 are included in different MEMS chips, e.g., one chip includes accelerometers and gyroscopes, another chip includes a magnetic sensor, another chip includes a pressure sensor and still another chip includes a GPS receiver.

Exemplary base station 200 collects sensor measurement information used to determine base station and/or base station antenna position, altitude and/or orientation. In some embodiments, this sensor measurement information and/or processed sensor measurement information, is sent, via I/O interface 202 to a configuration management device, e.g., for evaluation as to whether or not base station 200 has been satisfactory installed in accordance with a deployment plan. In various embodiments, the base station 200 may, and sometimes does, receive, e.g., via interface 202, corrective active information from the configuration management device, e.g., a command to reposition, e.g., re-orient, the base station using drive motor(s) 274 and motor controller 272, or an antenna pattern command, e.g., a command to select a different set of antenna patterns.

In some embodiments, the base station 200 can be, and sometimes is re-configured in real time or near real time, e.g., in response to schedule information, usage information, and/or information on the expected or determined location of people in a potential base station coverage area. In some such embodiments, the base station 200 receives signals from the configuration management node, e.g., a command message to re-orient the base station to change the coverage area via operating one or more motors in said base station, or a command message to change the selected set of antenna patterns.

Figure 3:
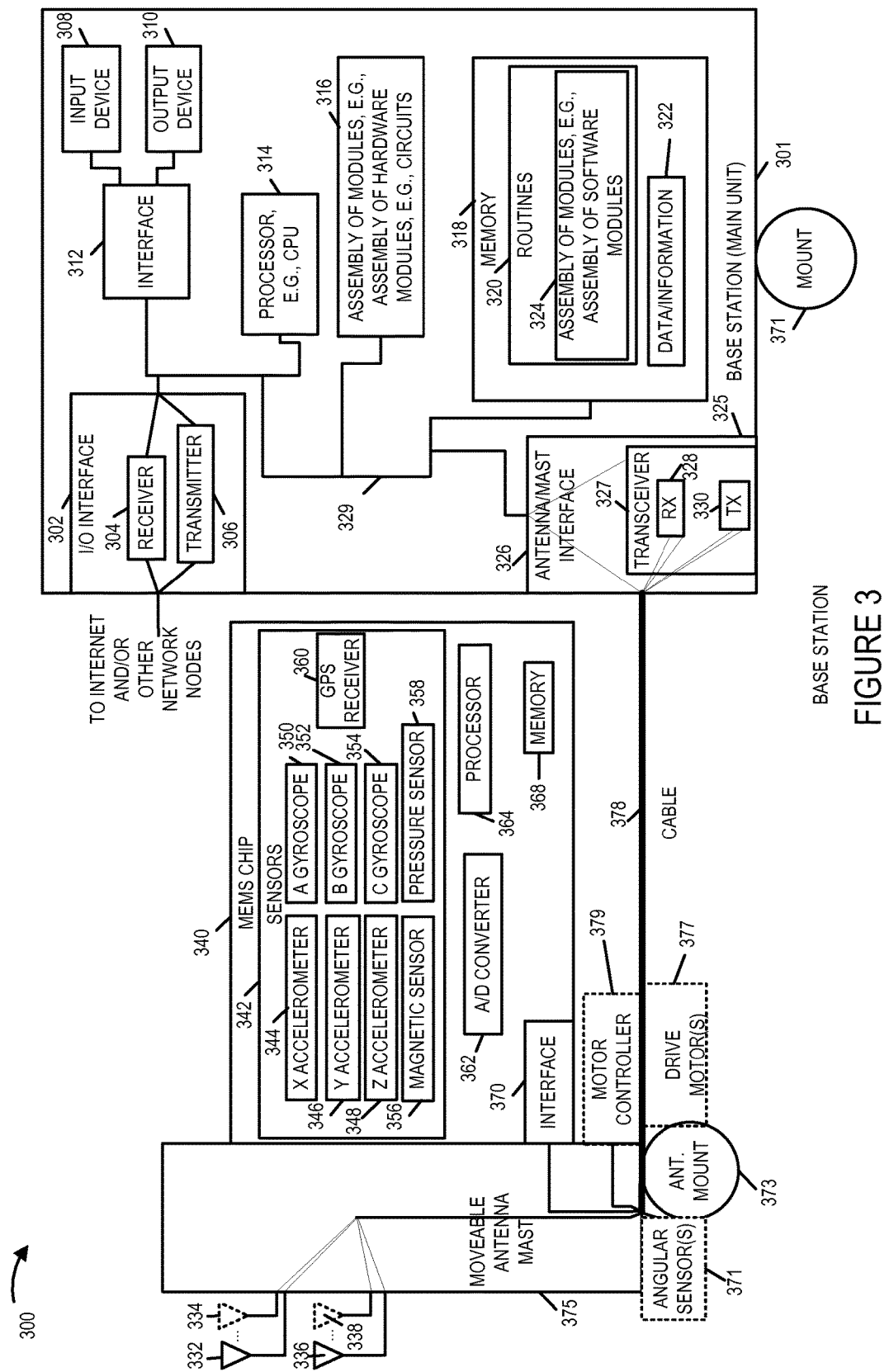
FIG. 3 is a drawing of another exemplary base station in accordance with various embodiments.

FIG. 3 is a drawing of an exemplary base station 300 in accordance with various embodiments. Exemplary base station 300 is, e.g., any of base stations (104, 106, 108, . . . , 109) of system 100 of FIG. 1. Exemplary base station 300 may be an outdoor or indoor base station. Exemplary base station 300 is, e.g., one of a WiFi base station, a small cell base station, a micro cell base station, a pico cell base station, or a femto cell base station. Exemplary base station 300 is, e.g., a base station mounted on a building, a base station mounted on a stadium, a base station mounted on a pole, e.g., a telephone pole or a light pole, a base station mounted on a cable, a base station mounted on a moveable base, a base station mounted on vehicle, a base station mounted on a chair, e.g., a lifeguard chair, etc.

Base station 300 includes a base station main unit 301, a moveable antenna mast 375, an antenna mast mount 373. Base station 300 further includes one or more antennas (332, . . . 334, 336, . . . , 336) attached to the movable antenna mast, a MEMS chip 340 attached to the moveable antenna mast 375. In some embodiments, the moveable antenna mast can be rotated, e.g., to change the orientation of the antenna(s). In some embodiments, the moveable antenna mast can be tilted, e.g., to change the orientation of the antenna(s). In some embodiments, the moveable antenna mast can be extended or retracted, e.g., to change the altitude of the antenna(s). In some embodiments, the MEMS chip 340 is attached to an antenna included in base station 300. Base station 300 further includes one or more angular sensor(s) 371, drive motor(s) 377 and a motor controller 379 for moving the antenna mast 375 and thus moving the antenna (332, . . . , 334, 336, . . . , 328). In some embodiments, there are three angular sensors and three corresponding drive motors. In some embodiments, the angular sensors are accurate to within 1 degree. In various embodiments, the angular sensors are resolvers, synchros, or optical sensors.

Base station main unit 300 includes an I/O interface 302, an input device, 308, an output device 310, an interface 312, a processor 314, e.g., a CPU, and assembly of modules 316, e.g., an assembly of hardware modules, e.g., circuits, memory 318, and an antenna/mast interface 327. I/O interface 302, interface 312, processor 314, assembly of modules 316, memory 318, and antenna/mast interface 326 are coupled together via a bus 329 over which the various elements may interchange data and information. Input device 308, is e.g., keyboard, mouse, etc., and output device 310 is, e.g., a display. Input device 308 and output device 310 are coupled to interface 312, via which the devices (308, 310) are coupled to bus 329.

I/O interface 302 includes a receiver 304 and a transmitter 306. The I/O interface 302 couples the base station 300 to the Internet and/or other network nodes. Memory 318 includes routines 320 and data/information 322. Routines 320 include an assembly of modules 324, e.g., an assembly of software modules. Processor 314 uses the routines 324 to control the operation of the base station 300. In some embodiments, at least some of the operations of the base station are performed and/or controlled by assembly of module 316.

Antenna/mast interface 326 includes a transceiver 327 including a receiver 328 and a transmitter 330. The transceiver 327 is coupled to at least one antenna via cable 378. In some embodiments, the same antenna is used for receive and transmit. In some embodiments, different antennas are used for receive and transmit. Receiver 328 is coupled to one or more antennas (332, . . . , 334) via which the base station 300 may receive wireless signals from wireless terminals, e.g., UE devices. Transmitter 330 is coupled to one or more antenna (336, . . . , 338) via which the base station 300 may transmit wireless signals to wireless terminals Base station 200 further includes a base station mount 371 for mounting the base station main unit 301.

Exemplary MEMS chip 340 includes a set of sensors 342 for performing measurements, an A/D convertor 362 for converting analog output from one or more sensors into a digital format, a dedicated processor 364, e.g., a CPU, a memory 368 and an I/O interface 370. Sensors 342 include three accelerometers (X accelerometer 344, Y accelerometer 346, Z accelerometer 348), three gyroscopes (A gyroscope 350, B gyroscope 352, and C gyroscope 354), a magnetic sensor 356, e.g., a magnetometer, a pressure sensor 358, and a GPS receiver 360. In various embodiments, the accelerometers (344, 346, 348) are substantially orthogonal to one another, e.g., have their measurement axes sustainably orthogonal to one another forming a triad. In various embodiments, the gyroscope (350, 352, 354) measurement axes are substantially orthogonal to one another. In some embodiments, the gyroscopes are substantially aligned with respect to the accelerometers. The accelerometers (344, 348, 356) measure acceleration and can be used to measure tilt, e.g., with respect to a local vertical based on the local gravity value. The gyroscopes (350, 352, 354) measure angular rate and can be used in determining an orientation based on the earth's rotational rate and the location on the earth. Pressure sensor 358 measures barometric pressure and can be used to determine height, e.g., height above sea level and/or height above ground. GPS receiver 360 receives GPS signals and can be used to determine location, altitude and/or velocity. Processor 364, e.g., a CPU controls the operation of the MEMS chip 340, e.g., to control the sensors to perform measurements and to output measurement data, to operate the A/D convertor 262, e.g., in a multiplexed fashion, to process measurement data, e.g., to determine a tilt angle, to determine a heading angle, to determine a height, etc., and/or to operate the interface 270, e.g., to communicate with the main unit 301. Memory 368 includes routines used by the processor 364, sensor measurement information, processed sensor measurement information, and control information. I/O interface 370 couples the MEMS chip 240 to bus 329 in the main unit via cable 378 and antenna/mask interface 327.

In some embodiments, different sensors 342 are included in different MEMS chips, e.g., one chip includes accelerometers and gyroscopes, another chip includes a magnetic sensor, another chip includes a pressure sensor and still another chip includes a GPS receiver.

Exemplary base station 300 collects sensor measurement information used to determine base antenna mask and/or base station antenna position, altitude and/or orientation. In some embodiments, this sensor measurement information and/or processed sensor measurement information, is sent, via I/O interface 302 to a configuration management device, e.g., for evaluation as to whether or not base station 300 has been satisfactory installed in accordance with a deployment plan. In various embodiments, the base station 300 may, and sometimes does, receive, e.g., via interface 302, corrective active information from the configuration management device, e.g., a command to reposition, e.g., re-orient, the base station antenna mast or base station antenna using drive motor(s) 377 and motor controller 379, or an antenna pattern command, e.g., a command to select a different set of antenna patterns.

In some embodiments, the base station 300 can be, and sometimes is re-configured in real time or near real time, e.g., in response to schedule information, usage information, and/or information on the expected or determined location of people in a potential base station coverage area. In some such embodiments, the base station 300 receives signals from the configuration management node, e.g., a command message to re-orient the base station to change the coverage area via operating one or more motors in said base station, or a command message to change the selected set of antenna patterns.

Figure 4:
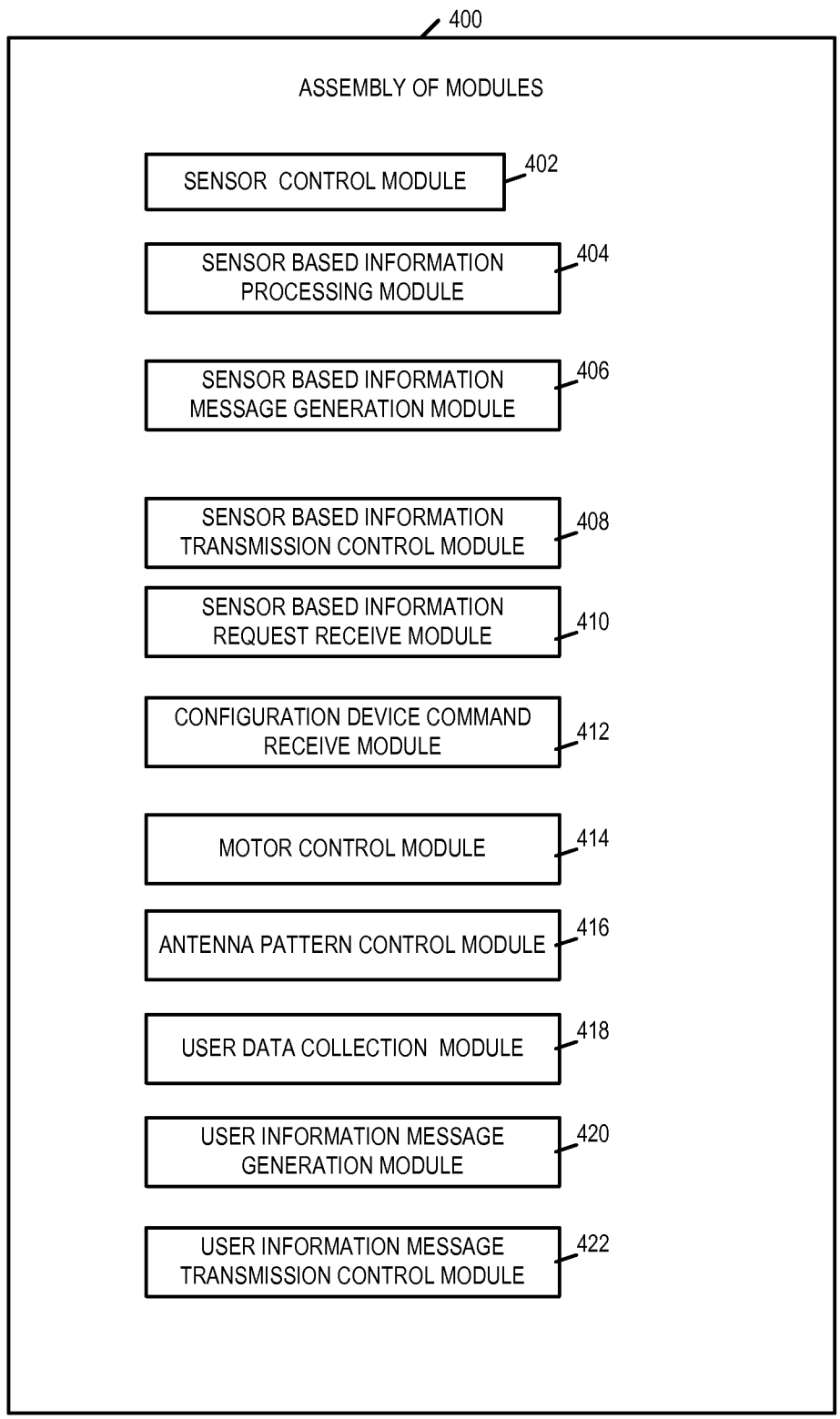
FIG. 4 is a drawing of an exemplary assembly of modules which may be included in the base station of FIG. 2 or FIG. 3.

FIG. 4 is a drawing of an assembly of modules 400, which may be included in an exemplary base station, e.g., base station 200 of FIG. 2 or base station 300 of FIG. 3 in accordance with an exemplary embodiment. The modules in the assembly of modules 400 can, and in some embodiments are, implemented fully in hardware within the processor 214 or processor 314, e.g., as individual circuits. The modules in the assembly of modules 400 can, and in some embodiments are, implemented fully in hardware within the assembly of modules 216 or 316, e.g., as individual circuits corresponding to the different modules. In other embodiments some of the modules are implemented, e.g., as circuits, within the processor 214 or 314 with other modules being implemented, e.g., as circuits within assembly of modules 216 or 316, external to and coupled to the processor 214 or 314. As should be appreciated the level of integration of modules in the processor and/or with some modules being external to the processor may be one of design choice.

Alternatively, rather than being implemented as circuits, all or some of the modules may be implemented in software and stored in the memory 218 or the memory 318, with the modules controlling operation of base station 200 of 300 to implement the functions corresponding to the modules when the modules are executed by a processor, e.g., processor 214 or 314. In some such embodiments, the assembly of modules 400 is included in the memory 218 or 318 as assembly of modules 224 or 324. In still other embodiments, various modules in assembly of modules 400 are implemented as a combination of hardware and software, e.g., with another circuit external to the processor providing input to the processor 214 or 314 which then under software control operates to perform a portion of a module's function. While shown in the FIGS. 2 and 3 embodiment as a single processor (214 or 314), e.g., computer, it should be appreciated that the processor 214 or 314 may be implemented as one or more processors, e.g., computers.

When implemented in software the modules include code, which when executed by the processor 214 or 314, configure the processor 214 or 314 to implement the function corresponding to the module. In embodiments where the assembly of modules 400 is stored in the memory 218 or 318, the memory 218 or 318 is a computer program product comprising a computer readable medium comprising code, e.g., individual code for each module, for causing at least one computer, e.g., processor 214 or 314, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 4 control and/or configure the base station 200 or 300 or elements therein such as the processor 214 or 314, to perform the functions of corresponding steps illustrated in the method described with respect to any of the FIGS. 1-10.

FIG. 4 is a drawing of an exemplary assembly of modules 400 which may be included in the base station of FIG. 2 or FIG. 3. Assembly of modules 400 includes a sensor control module 402, a sensor based information processing module 404, a sensor based information message generation module 406, a sensor based information transmission control module 408, a sensor based information request receive module 410, a configuration device command receive module 412, a motor control module 414, a antenna pattern control module 416, a user data collection module 418, a user information message generation module 420, a user information message transmission control module 422.

Sensor control module 402 is configured to control sensors include in the base station to perform measurements and output sensor based information including sensor measurements and/or processed sensor measurements. In some embodiments, the sensor control module 402 is configured to control one or more MEMS chips. Exemplary control operation preformed by sensor control module 402 include selecting the sensors to be used to perform measurements, triggering measurements, synchronizing measurements, setting rates for performing measurements, setting filter constants, setting rates of data output, setting formats for data output, etc.

Sensor based information processing module 404 processes received data from a sensor to generate sensor based information, e.g., in a format more suitable for the configuration management device. For example, in one embodiment, the sensor based information processing module 404 converts a pressure value to an altitude value above sea level and/or a height value above the ground. In another example, the sensor based information processing module 404 converts a magnetic field strength measurement to a heading value with respect to magnetic north and/or with respect to true north. In another example, the sensor based information processing module 404 converts a g-level value to a downward tilt angle. In another example, the sensor based processing module 404 converts a gyroscope angular rate value to a heading value with respect to north.

Sensor based information generation module 406 generates a message including sensor based information. The sensor based information may include sensor measurement information, e.g., from sensors in a MEMS chip, and/or processed sensor measurement information, e.g., from module 404. In some embodiments, the generated message including sensor based information includes at least one of: a pressure sensor measurement, an accelerometer measurement, a height based on a pressure sensor measurement, or orientation information based on an accelerometer measurement. In some embodiments, the generated message including sensor based information includes information based on one or more or all of: an accelerometer, a gyroscope, a pressure sensor, a magnetic sensor, and a GPS sensor, e.g., a GPS receiver.

Sensor based information transmission control module 408 is configured to control the base station to send a generated message including sensor based information to a configuration management device, e.g., as part of an initialization following an installation, in response to a request from the configuration management device, or as part of a real time or near real time closed loop control operation.

Sensor based information request receive module 410 is configured to receive a request from a configuration management device for sensor based information. For example, the configuration management device may have sent the request to evaluate a recent base station deployment, or to re-evaluate the base station as part of periodic maintenance or following an event, e.g. a wind storm, or as part of a closed loop control operation, e.g., to change antenna direction or change the set of antenna patterns in response to a schedule or anticipated or measured activity in a coverage area, e.g., due to changes in the number of people in an area.

Configuration device command receive module 412 is configured to receive a command from a configuration management device, e.g., a command to operate a motor to move the base station or a base station antenna to a new position or new orientation or a command to implement a different antenna pattern. The command may be to perform a corrective action on a detected improperly installed base station. The command may be to perform a repositioning or re-orienting operation in response to dynamic base station or base station antenna control, e.g., in response to a schedule and/or in response to current or anticipated user location information, e.g., as part of an optimization operation.

Motor control module 414 is configured to control a motor or motors in said base station to reposition or re-orient the base station, base station antenna or base station antenna mast in accordance with control information received from the configuration management device.

Antenna pattern control module 416 is configured to control the base station to implement a particular antenna pattern in response to a received antenna pattern command from the confirmation management device. In some embodiments different antenna patterns are enabled by selecting different sets of antenna segments to be used.

User data collection module 418 is configured to collect information regarding the number of users currently using the base station, the amount of data being communicated, and location information regarding the users. User data collection module 418 collects statistical user information which may be communicated to the configuration management device and be subsequently used by the configuration management device to optimize the network. Optimization of the network may, and sometimes does include commanding re-orientation of a base station antenna and/or commanding a change in a base station antenna pattern. User information message generation module 420 generates a message including collected user data to be communicated to the configuration management device. User information message transmission control module controls the transmitter of the base station to send generated user information messages to the configuration management device, at least some of the user information messages include information indicating the location of people in the base station coverage area.

Figures 5, 5A, 5B:
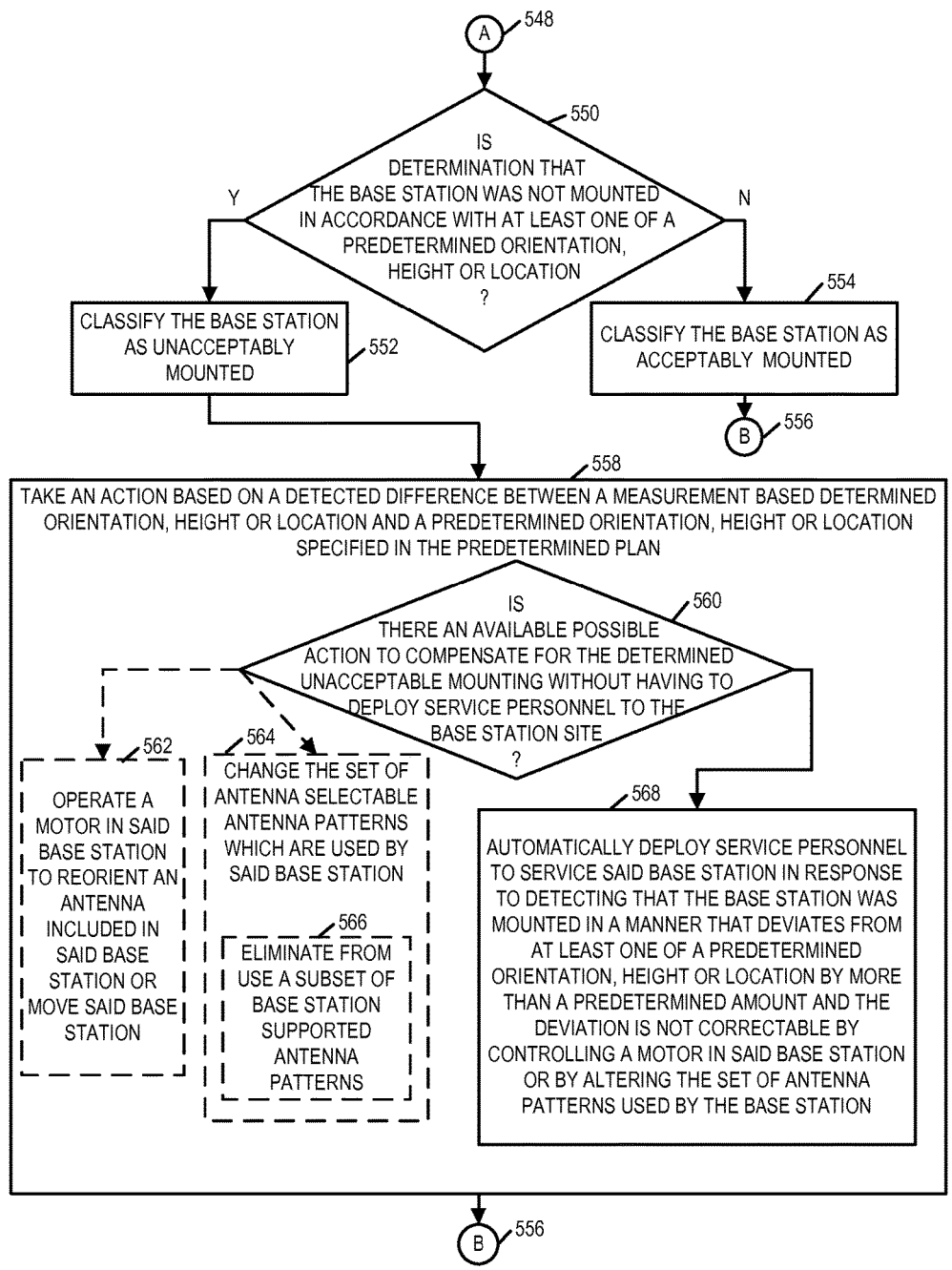
FIG. 5A is a first part of a flowchart of an exemplary method of operating a configuration management device in accordance with various exemplary embodiments.
FIG. 5B is a second part of a flowchart of an exemplary method of operating a configuration management device in accordance with various embodiments.
FIG. 5 comprises the combination of FIG. 5A and FIG. 5B.
Figure 5A:
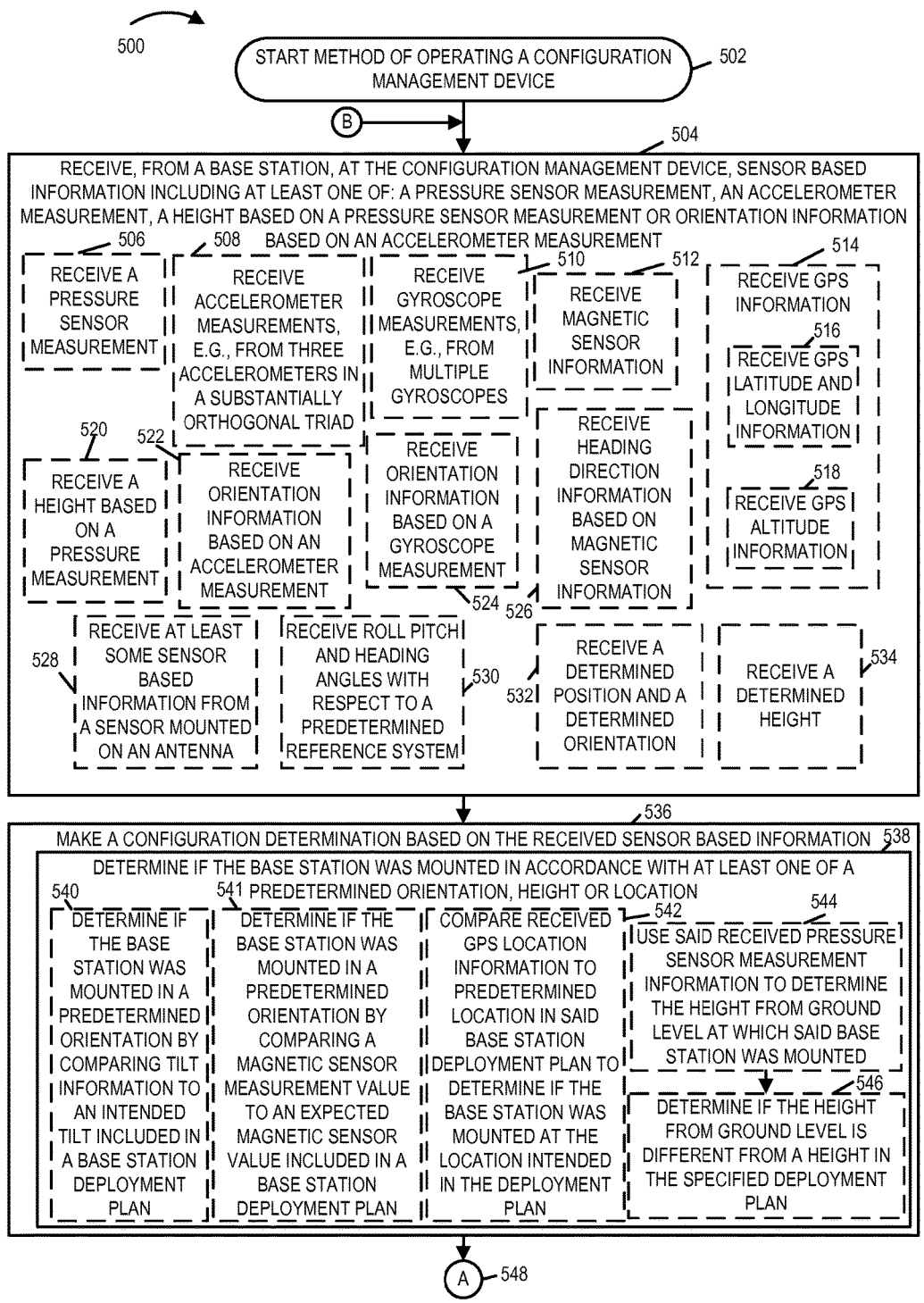

FIG. 5, comprising the combination of FIG. 5A and FIG. 5B, is a flowchart 500 of an exemplary method of operating a configuration management device in accordance with various embodiments. Operation starts in step 502, in which the configuration management device is powered on and initialized. Operation proceeds from start step 502 to step 504.

In step 504 the configuration management device receives, from a base station, at the configuration management device, sensor based information including at least one of: a pressure sensor measurement, an accelerometer measurement, a height based on a pressure measurement or orientation information based on an accelerometer measurement. Step 504 includes one or more or all of steps 506, 508, 510, 512, 514, 520, 522, 524, 526, 528, 530, 532 and 534. In step 506 the configuration management device receives from a base station a pressure sensor measurement. In step 508 the configuration management device receives from a base station accelerometer measurements, e.g., from three accelerometers in a substantially orthogonal triad. In step 510 the configuration management device receives from a base station gyroscope measurements, e.g., from multiple gyroscopes. In step 512 the configuration management device receives, from a base station, magnetic sensor measurements. In step 514 the configuration management device receives, from a base station, GPS information. In some embodiments, step 514 includes one or both of steps 516 and 518. In step 516 the configuration management device receives, from a base station, GPS latitude and longitude information. In step 518 the configuration management device receives, from a base station, GPS altitude information.

In step 520 the configuration management device receives, from a base station, a height based on a pressure measurement. In step 522 the configuration management device receives, from a base station, orientation information based on an accelerometer measurement. In step 524 the configuration management device receives, from a base station, orientation information based on a gyroscope measurement. In step 526 the configuration management device receives, from a base station, heading direction information based on magnetic sensor information.

In step 528 the configuration management device receives, from the base station, at least some sensor based information from a sensor mounted on an antenna. In step 530 the configuration management device, receives, from a base station roll, pitch and heading angles with respect to a predetermined reference system. In step 532 the configuration management device receives, from a base station, a determined position and a determined orientation. In step 534 the configuration management device receives, from a base station, a determined height.

In some embodiments, different sets of information are received from different base stations, e.g., as a function of the sensors included in the base station, the level of sensor measurement processing being performed at the base station, the level of sensor measurement processing being performed at the configuration management device, and/or site conditions at the base station site, e.g., is the base station GPS receiver able to acquire GPS signals of sufficient quality from enough satellites to achieve a 2D solution, e.g., a latitude, longitude solution, or is the base station GPS receiver able to acquire signals of sufficient quality from enough satellites to achieve a 3D solution, e.g., a latitude, longitude, altitude solution.

Operation proceeds from step 504 to step 536. Om step 536 the configuration management device makes a configuration determination based on the received sensor based information. Step 536 includes step 538 in which the configuration management device determines if the base station was mounted in accordance with at least one of a predetermined orientation, height or location. In various embodiments, step 538 includes one or more or all of steps 540, 542, 544 and 546. In step 540 the configuration management device determines if the base station was mounted in a predetermined orientation by comparing tilt information to an intended tilt included in a base station deployment plan. In step 541 the configuration management device determines if the base station was mounted in a predetermined orientation by comparing a magnetic heading sensor measurement value to an expected magnetic heading value included in a base station deployment plan. In step 542 the configuration management device compares received GPS location information to a predetermined location in said base station deployment plan to determine if the base station was mounted at the location intended in the deployment plan. In step 544 the configuration management device uses said received pressure sensor measurement information to determine the height from ground level at which said base station was mounted. In step 546 the configuration management device determines if the height from ground level is different from a height in the specified deployment plan.

Depending upon the deployment plan information corresponding to the particular base station, the actual base station mounting is evaluated, based on measurements, to a set of stored information in a deployment plan to determine whether or not the mounting is acceptable.

Operation proceeds from step 536, via connecting node A 548, to step 550. In step 550, if the determination is that base station was not mounted in accordance with at least one of a predetermined orientation, height or location, e.g., based on the deployment plan, then operation proceeds from step 550 to step 552 in which the configuration management device classifies the base station as unacceptably mounted. Operation proceeds from step 552 to step 558. In step 558 the configuration management device takes an action based on a detected different between a measurement based determined orientation, height or location and a predetermined orientation, height or location specified in the predetermined deployment plan for the base station. Step 558 includes step 560, optional step 562, 564, and step 568. In step 560 the configuration management device determines if there is an available possible action to compensate for the determined unacceptable mounting without having to deploy service personnel to the base station site. In some embodiments, some base stations may include a motor or motors for repositioning a base station or base station antenna that has be incorrectly mounted. In some embodiments, a base station may include the capability to change a set of antenna selectable antenna patterns which are to be used by the base station.

If the determination of step 560 is that there is an available possible action to compensate for the determined unacceptable mounting without having to deploy service personnel then operation proceeds from step 560 to one or both of steps 562 and 564. In step 562 the base station operates a motor in said base station to reorient an antenna included in said base station or to move said base station. In step 564 the configuration management device changes the set of antenna selectable antenna patterns which are used by said base station. In some such embodiments, step 564 includes step 566 in which the configuration management device eliminates from use a subset of base station supported antenna patterns.

If the determination of step 560 is that there is not an available possible action to take to compensate for the determined unacceptable mounting without having to deploy service personnel then operation proceeds from step 560 to step 568. In step 568 the configuration management node automatically deploys service personnel to service said base station in response to detecting that the base station was mounted in a manner that deviates from at least one of a predetermined orientation, height or location by more than a predetermined amount and the deviation is not correctable by controlling a motor in said base station or by altering the set of antenna patterns used by the base station.

Returning to step 550, in step 550, if the determination is that base station was mounted acceptably in accordance with at least one of a predetermined orientation, height or location, e.g., based on the deployment plan, then operation proceeds from step 550 to step 554 in which the configuration management device classifies the base station as acceptably mounted.

Operation proceeds from step 554 or step 558, via connecting node B 556, to step 504, e.g., and sensor based information is received from another recently deployed base station which is to be evaluated by the configuration management device.

Figure 6:
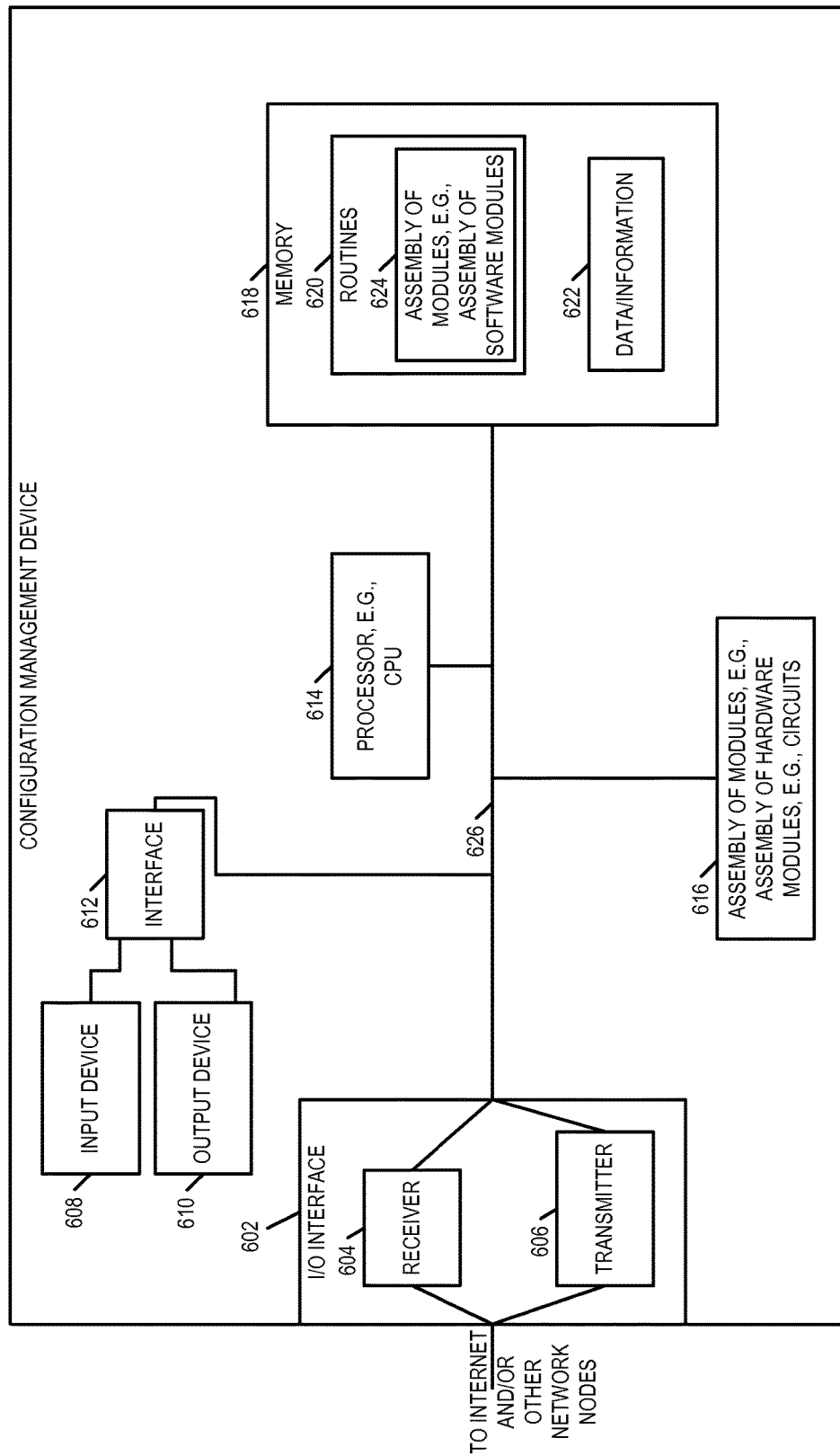
FIG. 6 is a drawing of an exemplary configuration management device in accordance with various exemplary embodiments.

FIG. 6 is a drawing of an exemplary configuration management device 600 in accordance with various exemplary embodiments. Exemplary configuration management device 600 is, e.g., configuration management device 102 of FIG. 1 or configuration management device 1002 of FIG. 10 or a configuration management device described with respect to any of FIGS. 1-10. Configuration management device 600 includes an I/O interface 602, an input device, 608, an output device 610, an interface 612, a processor 614, e.g., a CPU, and assembly of modules 616, e.g., an assembly of hardware modules, e.g., circuits, and memory 618. I/O interface 602, interface 612, processor 6014, assembly of modules 616, and memory 618 are coupled together via a bus 626 over which the various elements may interchange data and information. Configuration management device 600 further includes an input device 608, e.g., keyboard, mouse, etc., and an output device 610, e.g., a display via which an operator may input data and information and view data and information. Input device 608 and output device 601 are coupled to interface 612, via which the devices (608, 610) are coupled to bus 626.

I/O interface 602 includes a receiver 604 and a transmitter 606, via which the configuration management device may, respectively, receive and send data and information. The I/O interface 602 is coupled to the Internet and/or other network nodes. Configuration management device 600 receives sensor based information from deployed based stations via receiver 604. In some embodiments, a base station deployment plan is stored at a node, e.g., a database node, external to the configuration management node 600, and the configuration management node accesses the deployment plan via I/O interface 602, e.g., sending a request for information corresponding to a particular base station via transmitter 606, and receiving the requested information via receiver 604. The received sensor based information is used by the configuration management device to evaluate whether or not the deployed base station has been mounted correctly in accordance with a deployment plan, e.g., within acceptable tolerances. In some embodiments, configuration management device 600 transmits motor control command signals to a deployed base station to move the base station and/or an antenna of the base station via transmitter 606, e.g., to correct for an improperly installed base station. In some embodiments, configuration management device 600 transmits signals to change or select an antenna pattern set at a deployed base station, e.g., to compensate for an improperly mounted base station. In some embodiments, configuration management device 600 transmits information to trigger deployment of service personnel to a deployed base station site, e.g., to perform corrective action at an improperly mounted base station, e.g., reposition the base station and/or base station antenna to match the deployment plan.

Memory 618 includes routines 620 and data/information 622. Routine 620 includes an assembly of modules 624, e.g., an assembly of software modules. In some embodiments data/information 622 includes a base station deployment plan corresponding to a plurality of base stations. In some embodiments, the base station deployment plan includes, for each base station, base station identification information and at least one of: orientation information, location information, and height information. In some embodiments, the deployment plan may include different types of information corresponding to different base stations, e.g., as a function of the type of sensors included in the base station which are used to evaluate base station mounting.

Figure 7:
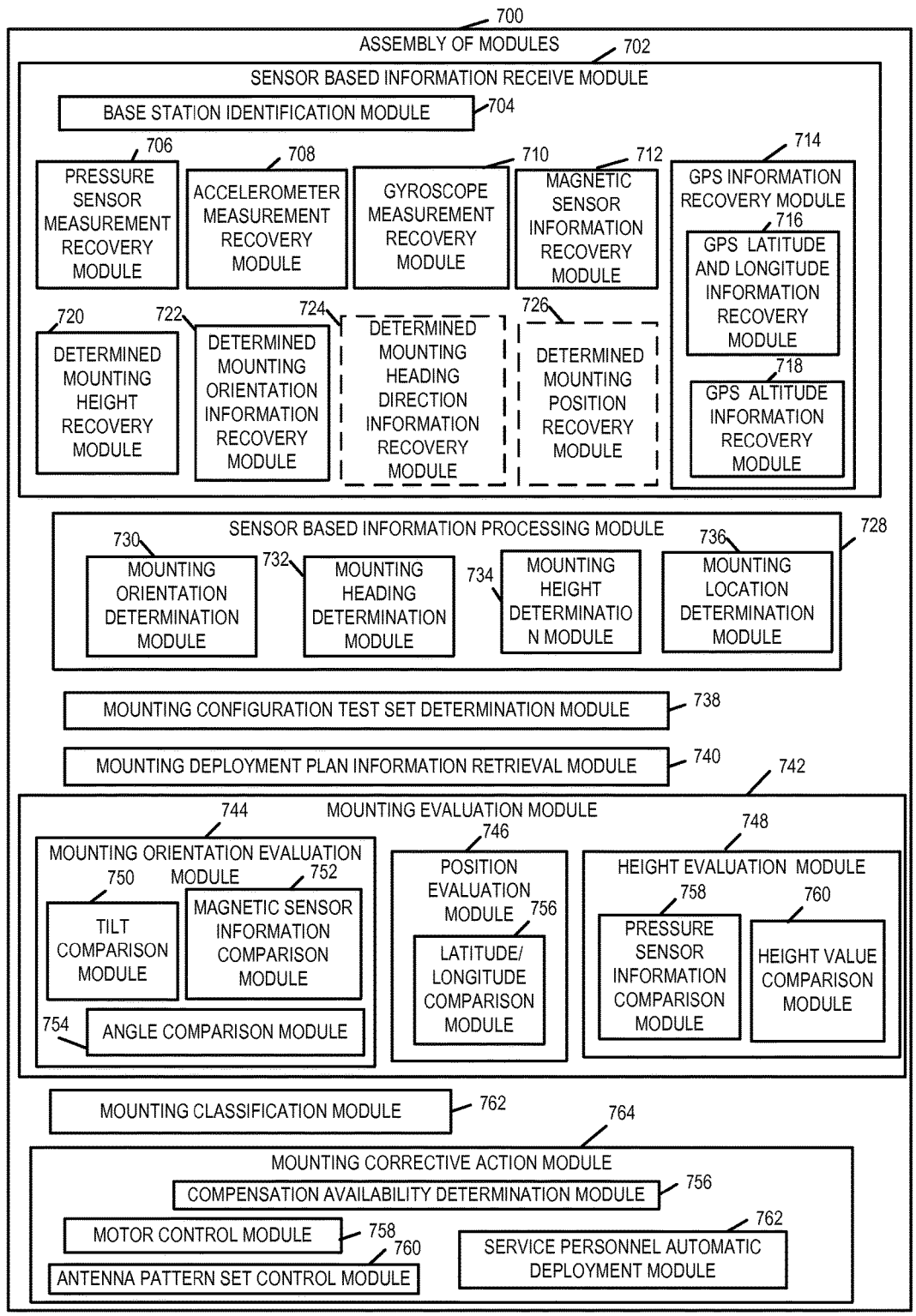
FIG. 7 is a drawing of an exemplary assembly of modules which may be included in the configuration management device of FIG. 6.

FIG. 7 is a drawing of an assembly of modules 700, which may be included in an exemplary configuration management device 600 of FIG. 6 in accordance with an exemplary embodiment. The modules in the assembly of modules 700 can, and in some embodiments are, implemented fully in hardware within the processor 614, e.g., as individual circuits. The modules in the assembly of modules 700 can, and in some embodiments are, implemented fully in hardware within the assembly of modules 616, e.g., as individual circuits corresponding to the different modules. In other embodiments some of the modules are implemented, e.g., as circuits, within the processor 614 with other modules being implemented, e.g., as circuits within assembly of modules 616, external to and coupled to the processor 614. As should be appreciated the level of integration of modules in the processor and/or with some modules being external to the processor may be one of design choice.

Alternatively, rather than being implemented as circuits, all or some of the modules may be implemented in software and stored in the memory 618 of the configuration management device 600, with the modules controlling operation of configuration management device 600 to implement the functions corresponding to the modules when the modules are executed by a processor, e.g., processor 614. In some such embodiments, the assembly of modules 700 is included in the memory 618 as assembly of modules 624. In still other embodiments, various modules in assembly of modules 700 are implemented as a combination of hardware and software, e.g., with another circuit external to the processor providing input to the processor 614 which then under software control operates to perform a portion of a module's function. While shown in the FIG. 6 embodiment as a single processor, e.g., computer, it should be appreciated that the processor 614 may be implemented as one or more processors, e.g., computers.

When implemented in software the modules include code, which when executed by the processor 614, configure the processor 614 to implement the function corresponding to the module. In embodiments where the assembly of modules 700 is stored in the memory 618, the memory 618 is a computer program product comprising a computer readable medium comprising code, e.g., individual code for each module, for causing at least one computer, e.g., processor 614, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 7 control and/or configure the configuration management device 600 or elements therein such as the processor 614, to perform the functions of corresponding steps illustrated in the method of the flowcharts of FIG. 5 and/or described with respect to any of the FIGS. 1-10. Thus the assembly of modules 700 includes various modules that perform functions of corresponding steps of one or more of FIG. 5.

FIG. 7 is a drawing of an assembly of modules 700 which may be included in the exemplary configuration management device 600 of FIG. 6. Exemplary assembly of modules 700 includes a sensor based information receive module 702, a sensor based information processing module 728, a mounting configuration rest set determination module 738, a mounting deployment plan information retrieval module 740, a mounting evaluation module 742, a mounting classification module 762, and a mounting corrective action module 764. Sensor based information receive module 702 is configured to control a receive, e.g., receiver 604, to receive from a base station, at the configuration management device, sensor based information including at least one of: a pressure sensor measurement, an accelerometer measurement, a height based on a pressure sensor measurement or orientation information based on an accelerometer measurement. Sensor based information receive module 702 is further configured to recover information including the received sensor based information, e.g., extract received sensor based information from received messages from the base station.

Sensor based information receive module 702 includes a base station identification module 704, a pressure sensor measurement recovery module 706, an accelerometer measurement recovery module 708, a gyroscope measurement recovery module 710, a magnetic sensor information recovery module 712, a GPS information recovery module 714, a determined mounting height recovery module 720, a determined mounting orientation information recovery module 722, a determined mounting heading direction information recovery module 724, and a determined mounting position recovery module 726. GPS information recovery module 714 includes a GPS latitude and longitude information recovery module 716 and a GPS altitude information recovery module 718.

Base station identification module 704 is configured to recover base station identification information corresponding to a received set of sensor base information. Pressure sensor measurement recovery module 706 is configured to recover a pressure sensor measurement from a received base station message. Accelerometer measurement recovery module 708 is configured to recover accelerometer measurements, e.g., g-level measurements, from three accelerometers in a substantially orthogonal triad, from received base station messages. Gyroscope measurement recovery module 710 is configured to recover gyroscope measurements, e.g., angular rate information, e.g., from multiple gyroscopes, from received base station messages. Magnetic sensor information recovery module 714 is configured to recover magnetic sensor information, e.g., a magnetic field strength measurement, from a received base station measurement. GPS information recovery module 514 is configured to recover GPS receiver solution information from received base station messages. GPS Latitude/Longitude information recovery module is configured to recover a GPS latitude value, a GPS longitude value, and a corresponding uncertainty value from received base station messages. GPS altitude information recovery module 718 is configured to recover a GPS altitude value, e.g., WGS-84 altitude value, and a corresponding uncertainty value from a received base station message. Determined mounting height recovery module 720 is configured to recover a base station determined mounting height, e.g., based on a pressure sensor measurement and/or GPS information, from a base station message. Determined mounting orientation information recovery module 722 is configured to recover base station determined mounting orientation information, e.g., based on accelerometer measurements and/or gyroscope measurements, from received base station messages. In some embodiments, the recovered base station mounting orientation information includes roll, pitch, and heading (azimuth) angles with respect to a predetermined reference system. Determined mounting heading direction information recovery module 724 is configured to recover a base station determined heading direction, based on a magnetic sensor measurement and/or a gyroscope measurement, from a received base station message. Determined mounting position recovery module 726 is configured to determine a base station determined mounting position from received base station messages. In some embodiments, the base station determines the mounting position using received GPS information and pressure sensor measurement information, e.g., the base station computes the position solution uses received messages corresponding to different satellites which are output from the GPS receiver.

Sensor based information processing module 728 includes a mounting orientation determination module 730, a mounting heading determination module 732, a mounting height determination module 734, and a mounting location determination module 736. Sensor based information processing module 728 is configured to process received sensor measurement information from sensors in a base station, e.g., received via messages from the base station, and determine one or more or all of: i) base station and/or base station antenna mounting orientation, ii) base station and/or base station antenna heading, e.g., azimuth, iii) base station and/or base station height, and/or iv) base station and/or base station mounting location. Mounting orientation determination module 730 is configured to determine a base station or base station antenna mounting orientation based on received accelerometer measurements, received gyroscope measurements, and/or received magnetic sensor measurements. For example, tilts is determined using the accelerometer measurements, and a heading or azimuth angle is determined used magnetic sensor measurement information, gyroscope measurement information, knowledge of the approximate latitude and longitude, and a stored magnetic field strength information, e.g., expected magnetic field strength information corresponding location and date. Mounting heading determination module 732 is configured to determine a base station or base station heading, e.g., azimuth, based on received magnetic sensor information and/or received gyroscope information. Mounting height determination module 734 is configured to determine a base station or base station antenna mounting height based on received pressure sensor information, received GPS altitude information, and/or stored information indicating the ground level height at the approximate location. In some embodiments, mounting height determination module 736 determines the height above ground level. Mounting location determination module 736 determines a mounting location of a base or base station antenna based on received GPS information and/or received pressure sensor information. In some embodiments, mounting location determination module 736 computes a position solution, e.g., using individual GPS satellite information received by the GPS receiver in the base station.

Mounting configuration test set determination module 738 is configured to determine based on received base station identification information from module 704 and information in a stored deployment plan, corresponding to the base station which is being evaluated for mounting acceptability, a set of parameters which are to be tested to evaluate the base station mounting. For example, for one base station's mounting may be evaluated for mounting orientation and mounting height; another base station may be valuated for mounting position, mounting height, and mounting orientation; another base station may be evaluated for mounting location and mounting heading, e.g., azimuth. In some embodiments, the evaluation set is a function of the site location, e.g., whether or not the site location is expected to be able to acquire a GPS solution and the expected quality of the GPS solution.

Mounting deployment plan retrieval module 740 is configured to retrieve a set of information corresponding to a base station identified by base station identification module 704, stored in a deployment plan. The set of information includes, e.g., information identifying the parameters which are to be tested to evaluate the base station's mounting, and expected values including tolerances used in comparisons with sensor based values for acceptance and/or rejection criteria.

Mounting orientation evaluation module 744 is configured to determine if the base station was mounted in a predetermined orientation included in a base station deployment plan. Mounting orientation evaluation module 744 includes a tilt comparison module 750, a magnetic sensor information comparison module 752, and an angle comparison module 754. Tilt comparison module 750 compares received or determined tilt information to an intended tilt included in a base station deployment plan to determine if the base station was mounted in a predetermined orientation. Magnetic sensor information comparison module 752 compares received magnetic sensor information, e.g., a detected magnetic field strength value, to an expected magnetic field strength value included in a base station deployment plan to determine if the base station was mounted in a predetermined orientation. Angle comparison module 754 compares received or determined angles, e.g., roll, pitch, azimuth angles, to expected angles in a base station deployment plan to determine if the base station was mounted in a predetermined orientation.

Position evaluation module 746 is configured to determine if the base station was mounted at the intended location in the base station deployment plan. Position evaluation module 746 includes a latitude/longitude comparison module 756. Latitude/longitude comparison module compares received GPS location information or determined GPS based location information to a predetermined location in a base station deployment plan to determine f the base station was mounted at the location intended in the deployment plan, e.g., is the error in location below a predetermined limit.

Height evaluation module 748 is configured to determine if the height, e.g., from ground level, is different from a height specified in the deployment plan. Height evaluation module 748 includes a pressure sensor information comparison module 758 an a height value comparison module 760. Pressure sensor information comparison module 758 is configured to compare a received pressure sensor measurement value to an expected pressure sensor measurement value, said expected pressure sensor measurement value being based on information in the deployment plan and current atmospheric pressure information, to determine if the base station is mounted at the height in the deployment plan. Height comparison module 760 is configured to compare a received or determined base station mounting height to a base station mounting height included in a deployment plan to determine if the base station height was mounted at the correct height. In some embodiments, the determined base station mounting height is determined based on a pressure sensor measurement. In some embodiments, the received base station mounting height is from a GPS receiver determination or based on processed received GPS signals. In some embodiments, the determined base station mounting height is based on both GPS information and pressure sensor information.

Mounting classification module 762 is configured to make a configuration determination based on received sensor based information. Mounting classification module 762 is configured to classify an evaluated base station mounting as acceptably mounted or unacceptably mounted based on the results of the testing of the mounting evaluation module 742. In some embodiments, if any of the specified tests for the base station in accordance with the deployment plan fails, then the base station is considered unacceptable mounted.

Mounting corrective action module 764 is configured to take an action based a determination of unacceptable mounting. Mounting corrective action module 764 is configured to take an action based on a detected difference between a measurement based determined orientation, height or location and a predetermined orientation, height, or location specified in the predetermined deployment plan.

Mounting corrective action module 764 includes a compensation availability determination module 756, a motor control module 758, an antenna pattern set control module 760, an a service personnel automatic deployment module 762. Compensation availability determination module 756 determines if there is an available possible action to take to compensate for the determined unacceptable mounting without having to deploy service personnel to the base station site. Compensation available determination module 756 performs the determination based on characteristics of the base station, e.g., does the base station includes motors for repositioning the base station or base station antennas, does the base station include the capability of selecting different sets of antenna patterns, etc., and the amount of the error detected. For example, there may be a range of limits to which the base station or base station antenna can be reoriented using the included motors in the base station.

Motor control module 758 is configured to operate a motor in a base station to reorient an antenna included in the base station or to move the base station, e.g., motor control module sends a reposition message to the base station to control the base station to reposition the base station or an antenna in the base station using a motor. Antenna pattern set control module 760 is configured to change the set of antenna selectable antenna patterns which are used by the base station, e.g., antenna pattern set control module send a message to the base station is change a user selectable set of antenna patterns. In some embodiments, antenna pattern set control module 760 is configured to control the base station to eliminate from use a subset of base station supported antenna patterns. Service personnel automatic deployment module 762 is configured to automatically deploy service personnel to a base station in response to detecting that the base station was mounted in a manner that deviates from at least one of a predetermined orientation, height or location by more than a predetermined amount and the deviation is not correctable by controlling a motor in said base station or by altering the set of antenna patterns used by the base station.

Figures 8, 8A, 8B:
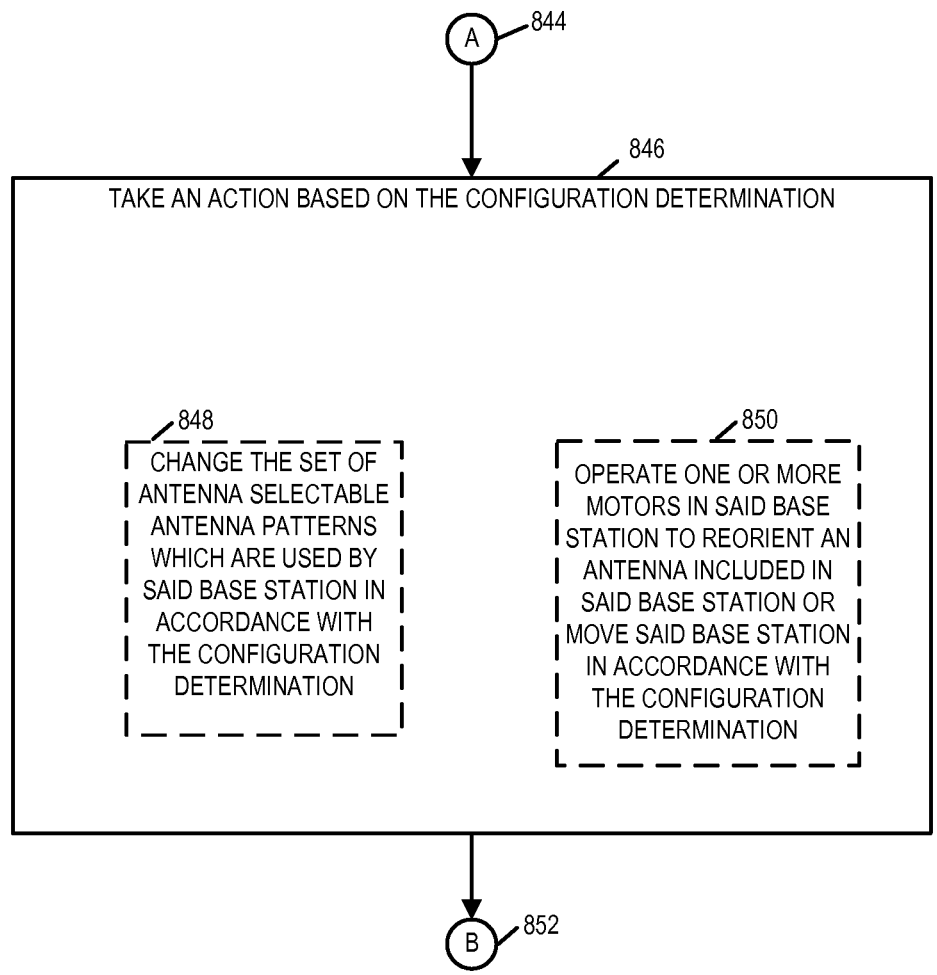
FIG. 8A is a first part of a flowchart of an exemplary method of operating a configuration management device in accordance with various exemplary embodiments.
FIG. 8B is a second part of a flowchart of an exemplary method of operating a configuration management device in accordance with various embodiments.
FIG. 8 comprises the combination of FIG. 8A and FIG. 8B.
Figure 8A:
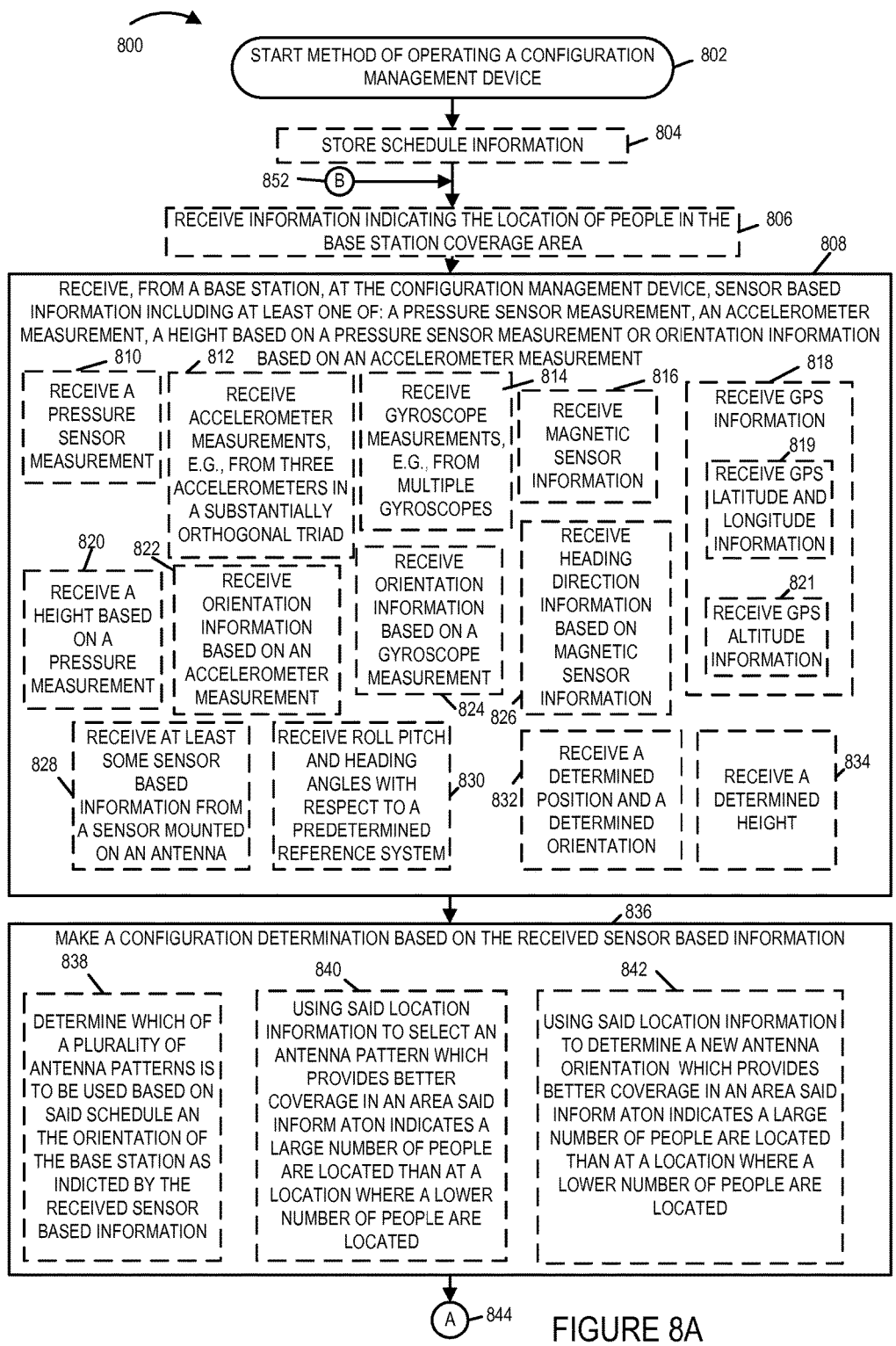

FIG. 8, comprising the combination of FIG. 8A and FIG. 8B, is a flowchart 800 of an exemplary method of operating a configuration management device in accordance with various embodiments. Operation starts in step 802 and proceeds to step 804. In step 804, the configuration management device stores schedule information.

Operation proceeds from step 804 to step 806. In step 806, the configuration management device receives information indicating the location of people in the base station coverage area. Operation proceeds from step 806 to step 808. In step 808, the configuration management device receives, from a base station, at the configuration management device, sensor based information including art least one of: a pressure sensor measurement, an accelerometer measurement, a height based on a pressure sensor measurement, or orientation information based on an accelerometer measurement.

Step 808 includes one or more or all of steps 810, 812, 814, 816, 818, 820, 822, 824, 826, 828 830, 832 and 834. In step 810 the configuration management device receives from a base station a pressure sensor measurement. In step 812 the configuration management device receives from a base station accelerometer measurements, e.g., from three accelerometers in a substantially orthogonal triad. In step 814 the configuration management device receives from a base station gyroscope measurements, e.g., from multiple gyroscopes. In step 816 the configuration management device receives, from a base station, magnetic sensor measurements. In step 818 the configuration management device receives, from a base station, GPS information. In some embodiments, step 818 includes one or both of steps 819 and 821. In step 819 the configuration management device receives, from a base station, GPS latitude and longitude information. In step 821 the configuration management device receives, from a base station, GPS altitude information.

In step 820 the configuration management device receives, from a base station, a height based on a pressure measurement. In step 822 the configuration management device receives, from a base station, orientation information based on an accelerometer measurement. In step 824 the configuration management device receives, from a base station, orientation information based on a gyroscope measurement. In step 830 the configuration management device receives, from a base station, heading direction information based on magnetic sensor information.

In step 828 the configuration management device receives, from the base station, at least some sensor based information from a sensor mounted on an antenna. In step 830 the configuration management device, receives, from a base station roll, pitch and heading angles with respect to a predetermined reference system. In step 832 the configuration management device receives, from a base station, a determined position and a determined orientation. In step 834 the configuration management device receives, from a base station, a determined height.

In some embodiments, different sets of information are received from different base stations, e.g., as a function of the sensors included in the base station, the level of sensor measurement processing being performed at the base station, the level of sensor measurement processing being performed at the configuration management device, and/or site conditions at the base station site, e.g., is the base station GPS receiver able to acquire GPS signals of sufficient quality from enough satellites to achieve a 2D solution, e.g., a latitude, longitude solution, or is the base station GPS receiver able to acquire signals of sufficient quality from enough satellites to achieve a 3D solution, e.g., a latitude, longitude, altitude solution.

In some embodiments, some of steps 810, 812, 814, 816, 818, 820, 822, 826, 828, 820, and 832 are performed jointly, e.g., as part of a joint operation. For example, in some embodiments, step 820 and 822 are combined, the received orientation information is based on both accelerometer measurements and gyroscope measurements.

Operation proceeds from step 808 to step 836. In step 836 the configuration management device makes a configuration determination based on the received sensor based information. In various embodiments, step 836 includes one or more or all of steps 838, 840 and 842. In step 838 the configuration management device determines which of a plurality of antenna patterns is to be used based on said schedule, e.g., received in step 804, and the orientation of the base station as indicated by the received sensor based information, e.g., from step 808.

In some embodiments, the schedule information received in step 804, includes information about a scheduled time or a sporting event, concert or other entertainment event. In some such embodiments, determining which of a plurality of antenna patterns to use based on said schedule and the orientation of the base station as indicated by the received sensor based information includes: determining to use a first antenna pattern during a first time period in which people are expected to be arriving or leaving said sporting event, concert or other entertainment event and determining to uses a second antenna pattern during a second time period during which said event is to be ongoing. In various embodiments, the antenna pattern determined to be used during a given time period alters the base station coverage to take into consideration the expected location of people in the base station coverage area at different time, e.g., when people are entering or leaving an event as opposed to while they are inside the area or a hall or stadium where the event is scheduled to take place.

In step 840 the configuration management device uses said location information, e.g., received in step 806, to select an antenna pattern which provides better coverage in an area said information indicates a large number of people are located than at a location where a lower number of people are located. In step 842, the configuration management device uses said location information, e.g., received in step 806, to determine a new antenna orientation which provides better coverage, e.g., higher overall data capacity for the area, in an area said information indicates a large number people are located than a location where a lower number of people are location. In some embodiments, the received information of step 806 is based on at least one of usage statistics form the base station or from real time feedback information obtained from one or more other devices, e.g., a pattern of usage data from other base station many indicate a crowd is headed in a particular direction and the base station may be configured to provide coverage in an area into which the crowd is headed before the crowd reaches the coverage area. Operation proceeds from step 836, via connecting node A 844 to step 846.

In step 846 the configuration management device takes an action based on the configuration determination. In some embodiments, step 846 includes one or both of steps 848 and 850. In step 848 the configuration management device changes the set of antenna selectable pattern which are used by the base station in accordance with the configuration determination. In step 850 the configuration management device operates one or more motors in said base station to reorient an antenna included in said base station or to move said base station in accordance with the configuration determination. In some embodiments, the configuration management device controls the base station or base station antenna position, altitude and/or orientation via closed loop control in real time or near real time. Operations proceeds from step 846 via connecting node B 852 to step 806.

Figure 9:
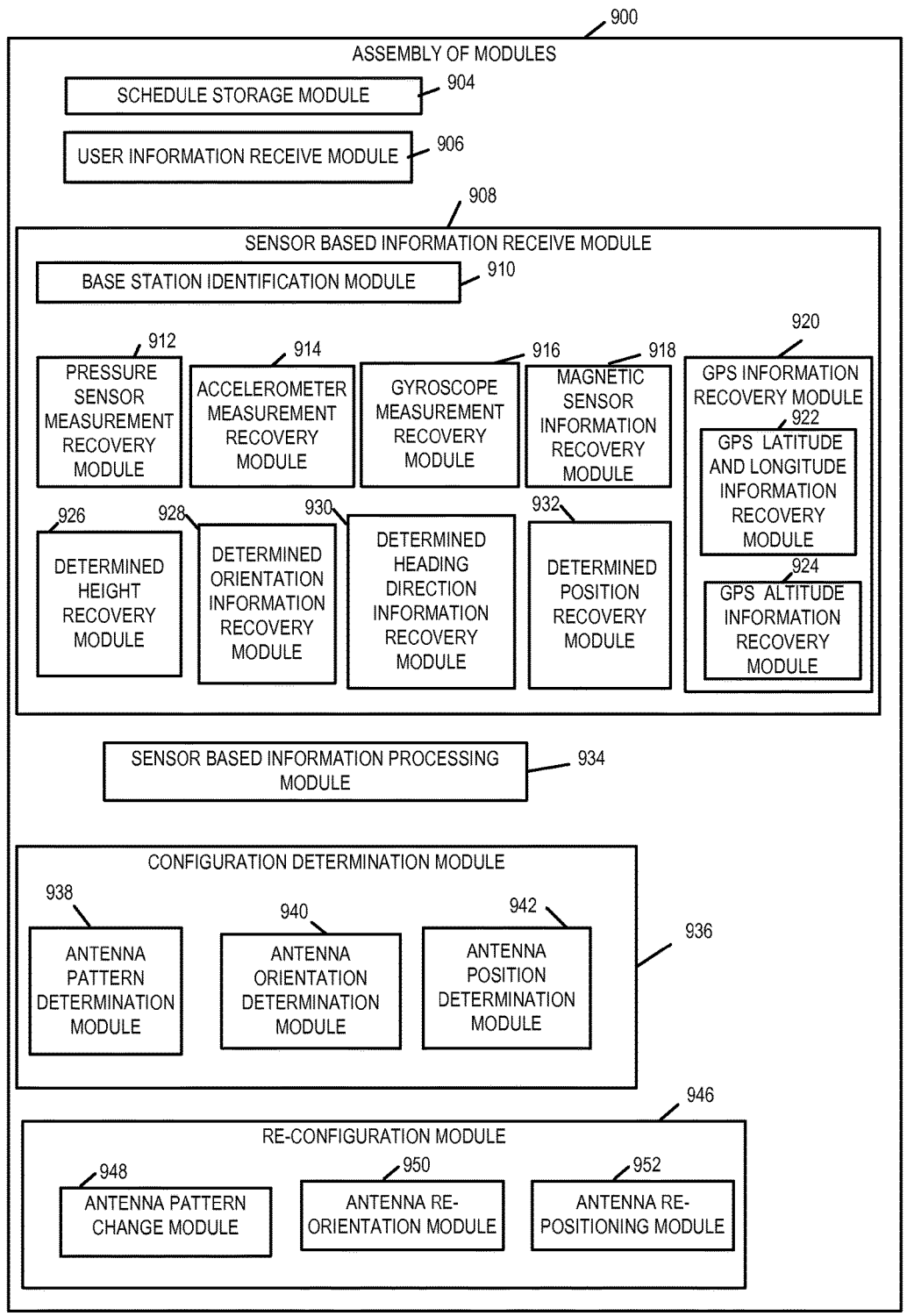
FIG. 9 is a drawing of an exemplary assembly of modules which may be included in the configuration management device of FIG. 6.

FIG. 9 is a drawing of an assembly of modules 900, which may be included in an exemplary configuration management device 600 of FIG. 6 in accordance with an exemplary embodiment. The modules in the assembly of modules 900 can, and in some embodiments are, implemented fully in hardware within the processor 614, e.g., as individual circuits. The modules in the assembly of modules 900 can, and in some embodiments are, implemented fully in hardware within the assembly of modules 616, e.g., as individual circuits corresponding to the different modules. In other embodiments some of the modules are implemented, e.g., as circuits, within the processor 614 with other modules being implemented, e.g., as circuits within assembly of modules 616, external to and coupled to the processor 614. As should be appreciated the level of integration of modules in the processor and/or with some modules being external to the processor may be one of design choice.

Alternatively, rather than being implemented as circuits, all or some of the modules may be implemented in software and stored in the memory 618 of the configuration management device 600, with the modules controlling operation of configuration management device 600 to implement the functions corresponding to the modules when the modules are executed by a processor, e.g., processor 614. In some such embodiments, the assembly of modules 900 is included in the memory 618 as assembly of modules 624. In still other embodiments, various modules in assembly of modules 900 are implemented as a combination of hardware and software, e.g., with another circuit external to the processor providing input to the processor 614 which then under software control operates to perform a portion of a module's function. While shown in the FIG. 6 embodiment as a single processor, e.g., computer, it should be appreciated that the processor 614 may be implemented as one or more processors, e.g., computers.

When implemented in software the modules include code, which when executed by the processor 614, configure the processor 614 to implement the function corresponding to the module. In embodiments where the assembly of modules 700 is stored in the memory 618, the memory 618 is a computer program product comprising a computer readable medium comprising code, e.g., individual code for each module, for causing at least one computer, e.g., processor 614, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 9 control and/or configure the configuration management device 600 or elements therein such as the processor 614, to perform the functions of corresponding steps illustrated in the method of the flowcharts of FIG. 8 and/or described with respect to any of the FIGS. 1-10. Thus the assembly of modules 900 includes various modules that perform functions of corresponding steps of one or more of FIG. 8.

FIG. 9 is a drawing of an assembly of modules 900 which may be included in the exemplary configuration management device 600 of FIG. 6. Exemplary assembly of modules 900 includes a schedule storage module 904, a user information receive module 906, a sensor based information receive module 908, a sensor based information processing module 934, a configuration determination module 936, and a re-configuration module 946.

Schedule storage module 904 is configured to store schedule information. In some embodiments, the schedule information includes information about a scheduled time of a sporting event, concert or other entertainment event. In some embodiments, different potential base station coverage areas are expected to be populated with wireless users requesting air link resources at different times.

User information receive module 906 is configured to receive information indicating location of people in the base station coverage area. In some embodiments, the received information indicating the location of people in the base station coverage area is based on at least one of usage statistics from the base station or from real time feedback information obtained from one or more other devices. For example, a pattern of data usage from other base stations may indicate a crowd is headed in a particular direction an the base station may be configured to provide coverage in the area into which the crowd is headed before the crowd reaches the coverage area.

Sensor based information receive module 908 is configured to control a receiver, e.g., receiver 604, to receive from a base station, at the configuration management device, sensor based information including at least one of: a pressure sensor measurement, an accelerometer measurement, a height based on a pressure sensor measurement or orientation information based on an accelerometer measurement. Sensor based information receive module 908 is further configured to recover information including the received sensor based information, e.g., extract received sensor based information from received messages from the base station.

Sensor based information receive module 908 includes a base station identification module 910, a pressure sensor measurement recovery module 912, an accelerometer measurement recovery module 914, a gyroscope measurement recovery module 916, a magnetic sensor information recovery module 918, a GPS information recovery module 920, a determined height recovery module 926, a determined orientation information recovery module 928, a determined heading direction information recovery module 930, and a determined position recovery module 932. GPS information recovery module 920 includes a GPS latitude and longitude information recovery module 922 and a GPS altitude information recovery module 924.

Base station identification module 910 is configured to recover base station identification information corresponding to a received set of sensor based information. Pressure sensor measurement recovery module 912 is configured to recover a pressure sensor measurement from a received base station message. Accelerometer measurement recovery module 914 is configured to recover accelerometer measurements, e.g., g-level measurements, from three accelerometers in a substantially orthogonal triad, from received base station messages. Gyroscope measurement recovery module 916 is configured to recover gyroscope measurements, e.g., angular rate information, e.g., from multiple gyroscopes, from received base station messages. Magnetic sensor information recovery module 918 is configured to recover magnetic sensor information, e.g., a magnetic field strength measurement, from a received base station message. GPS information recovery module 920 is configured to recover GPS receiver solution information from received base station messages. GPS Latitude/Longitude information recovery module 922 is configured to recover a GPS latitude value, a GPS longitude value, and a corresponding uncertainty value from received base station messages. GPS altitude information recovery module 924 is configured to recover a GPS altitude value, e.g., WGS-84 altitude value, and a corresponding uncertainty value from a received base station message. Determined height recovery module 926 is configured to recover a base station determined height, e.g., a base station antenna height, based on a pressure sensor measurement and/or based on GPS information, from a received base station message. Determined orientation information recovery module 928 is configured to recover base station determined orientation information, e.g., base station determined antenna orientation information, based on accelerometer measurements and/or gyroscope measurements, from received base station messages. In some embodiments, the recovered base station orientation information includes roll, pitch, and heading (azimuth) angles with respect to a predetermined reference system. Determined heading direction information recovery module 930 is configured to recover a base station determined heading direction, e.g., a base station antenna pointing direction, e.g., with respect to north, based on a magnetic sensor measurement and/or a gyroscope measurement, from a received base station message. Determined position recovery module 726 is configured to determine a base station determined position, e.g., a base station determined antenna position, from received base station messages. In some embodiments, the base station determines the position using received GPS information and pressure sensor measurement information, e.g., the base station computes the position solution uses received messages corresponding to different satellites which are output from the GPS receiver.

Sensor based information processing module 934 is configured to process received sensor information from a base station, e.g., to change the information into a format which is more useful to the configuration management device. In some embodiments, the sensor based information processing module includes an orientation determination module, a heading determination module, a height determination module, and a location determination module 936. The sensor based information processing module 934 is configured to process received sensor measurement information from sensors in a base station, e.g., received via messages from the base station, and determine one or more or all of: i) base station and/or base station antenna orientation, ii) base station and/or base station antenna heading, e.g., azimuth, iii) base station and/or base station height, and/or iv) base station and/or base station location. Orientation determination module is configured to determine a base station or base station antenna orientation based on received accelerometer measurements, received gyroscope measurements, and/or received magnetic sensor measurements. For example, tilts, e.g., downward tilts, are determined using the accelerometer measurements, and a heading or azimuth angle is determined used magnetic sensor measurement information, gyroscope measurement information, knowledge of the approximate latitude and longitude, and a stored magnetic field strength information, e.g., expected magnetic field strength information corresponding location and date. The heading determination module is configured to determine a base station or base station antenna heading, e.g., azimuth, based on received magnetic sensor information and/or received gyroscope information. The height determination module is configured to determine a base station or base station antenna height based on received pressure sensor information, received GPS altitude information, and/or stored information indicating the ground level height at the approximate location. In some embodiments, the height determination module determines the height above ground level. The location determination module determines a mounting location of a base or base station antenna based on received GPS information and/or received pressure sensor information. In some embodiments, the location determination module computes a position solution, e.g., using individual GPS satellite information received by the GPS receiver in the base station.

Configuration determination module 936 is configured to make a configuration determination based on the received sensor based information. Configuration determination module 936 includes an antenna pattern determination module 938, an antenna orientation determination module 940, and an antenna position determination module 942. Antenna pattern determination module 938 is configured to determine which of a plurality of antenna patterns to be used based on the schedule and the orientation of the base station as indicated by the received sensor information. In some such embodiments, the schedule information includes information about a schedule time of a sporting event, concert or other entertainment event, and the antenna pattern determination module 938 is configured to determine to use a first antenna pattern during a first time period people are expected to be arriving or leaving the sporting event, concert or other entertainment event, and is configured to determine to use a second antenna pattern during a second time period during which said event is to be ongoing. In some such embodiments, the antenna pattern determined to be used during a given time period alters the base station coverage area at different time, e.g., when people are entering or leaving an event as opposed to while they are inside the area, arena, stadium, or hall where the event is scheduled to take place. In some embodiments, the antenna pattern determination module 938 is configured to use received information indicating the location of people in the base station coverage are to select an antenna pattern which provides better coverage, e.g., better overall data capacity for the area, in an area said information indicates a larger number of people are located than at a location where a lower number of people are located. In some embodiments, the information is based on at least one of usage statistics from the base station or real time feedback information obtained from one or more other devices, e.g., a pattern of data usage from other base stations may be configured to provide coverage in the area into which the crowd is headed before the crowd reaches the coverage area.

Antenna orientation determination module 940 is configured to determine a new antenna orientation to be used based on the schedule and the current orientation of the base station as indicated by the received sensor information. In some such embodiments, the schedule information includes information about a schedule time of a sporting event, concert or other entertainment event, and the antenna orientation determination module 940 is configured to determine to use a first antenna orientation during a first time period people are expected to be arriving or leaving the sporting event, concert or other entertainment event, and is configured to determine to use a second antenna orientation during a second time period during which said event is to be ongoing. In some such embodiments, the antenna orientation determined to be used during a given time period alters the base station coverage area at different time, e.g., when people are entering or leaving an event as opposed to while they are inside the area, arena, stadium, or hall where the event is scheduled to take place. In some embodiments, the antenna orientation determination module 940 is configured to use received information indicating the location of people in the base station coverage area to select an antenna orientation which provides better coverage, e.g., better overall data capacity for the area, in an area said information indicates a larger number of people are located than at a location where a lower number of people are located. In some embodiments, the information is based on at least one of usage statistics from the base station or real time feedback information obtained from one or more other devices, e.g., a pattern of data usage from other base stations may be configured to provide coverage in the area into which the crowd is headed before the crowd reaches the coverage area.

In some embodiments, a base station antenna may be, and sometimes is relocated to a new location, e.g., at least one of the latitude, longitude or altitude coordinates corresponding to the antenna location can be, and sometimes are changed. For example, in some embodiments, the base station may be moveable, e.g., the base station may be located on a cable, on a guide rail, or on a unmanned vehicle. Antenna position determination module 942 is configured to determine a new antenna position to be used based on the schedule and the current position of the base station as indicated by the received sensor based information. In some such embodiments, the schedule information includes information about a schedule time of a sporting event, concert or other entertainment event, and the antenna position determination module 942 is configured to determine to use a first antenna position during a first time period people are expected to be arriving or leaving the sporting event, concert or other entertainment event, and is configured to determine to use a second antenna position during a second time period during which said event is to be ongoing. In some such embodiments, the antenna position determined to be used during a given time period alters the base station coverage area at different time, e.g., when people are entering or leaving an event as opposed to while they are inside the area, arena, stadium, or hall where the event is scheduled to take place. In some embodiments, the antenna position determination module 942 is configured to use received information indicating the location of people in the base station coverage area to select an antenna position which provides better coverage, e.g., better overall data capacity for the area, in an area said information indicates a larger number of people are located than at a location where a lower number of people are located. In some embodiments, the information is based on at least one of usage statistics from the base station or real time feedback information obtained from one or more other devices, e.g., a pattern of data usage from other base stations may be configured to provide coverage in the area into which the crowd is headed before the crowd reaches the coverage area.

Re-configuration module 946 is configured to take an action based on the configuration determination of configuration determination module 936, e.g., implement a change with regard to selected antenna patterns, controls an antenna to be re-oriented, and/or control an antenna to be moved to a new location. Re-configuration module 946 includes and antenna pattern change module 948, an antenna re-orientation module 950 and an antenna re-positioning module 952. Antenna pattern change module 948 is configured to change the set of antenna selected patterns which are used by said base station in accordance with the configuration determination. Antenna re-orientation module 950 is configured to operate one or more motors in said base station to reorient an antenna included in said base station, e.g., by moving the antenna directly, by moving the antenna mast, and/or by moving the base station. Antenna re-positioning module 952 is configured to operate one or more motors in said base station to move the antenna to a new location in accordance with the configuration determination.

FIG. 10 is a drawing 1000 illustrating a system including a configuration management device 1002 and a plurality of base stations (BS 1 1004, BS 2 1006, BS 3 1008, BS 4 1010), e.g., access points. The base stations (1004, 1006, 1008, 1010) are mounted within a station, with station cross section profile 1001. The base stations (1004, 1006, 1008, 1010) are installed, e.g., mounted, in accordance with a base station deployment plan intended to isolate the energy for each base station to the desired coverage area for the base station, e.g., to limit interference between base stations.

The base stations (1004, 1006, 1008, 1010) mounting points and approximate base station orientations, e.g., antenna orientations, 1014 are shown by viewing the position each of the base stations within the stadium, the tilt of the object representing the base station and the dotted lines coming out of the base station, e.g., toward seating area. Base station 1 1004 is positioned and oriented to cover lower 100 level seats. Base station 2 1006 is positioned and oriented to cover upper 100 level seats. Base station 3 1008 is positioned and oriented to cover 200 level seats and 200 and 400 suite boxes. Base station 4 1010 is positioned and oriented to cover 400 level seats.

The configuration management device 1002 is coupled to each of the base stations (1004, 1006, 1008, 1010) via a backhaul network and/or the Internet. The base stations (1004, 1006, 1008, 1010) include sensors, e.g., accelerometers, gyroscopes, pressure sensors, magnetic sensors, GPS receivers, etc., used obtaining sensor based information for determining orientation, altitude and/or position, e.g., of the base station and/or base station antenna.

In various embodiments, the configuration management device 1002 implements a method in accordance with flowchart 500 of FIG. 5 to evaluate, based on sensor based information received from the base stations, the installation of the base stations (1004, 1006, 1008, 1010) and/or to take corrective actions in response to detected problems. In some embodiments, one or more of the base stations (104, 106, 1008, 1010) include one or more motors for moving and/or re-orienting a base station and/or base station antenna.

In some embodiments, the configuration management device 1002 implements a method in accordance with flowchart 800 of FIG. 8 to change, e.g., adjust, the coverage area or one or more base stations, e.g., in response to detected usage levels and/or detected levels of people and/or a schedule. For example, a base station antenna is re-oriented under the direction of the configuration management device 1002 to provide better coverage to a highly populated section of the stadium than to a lowly populated section of the stadium. In some instances, certain sections of the stadium may have been intentionally left vacant, e.g., no tickets were sold corresponding to a particular block of seats, so coverage to those area may be tuned off, e.g., one or more antenna segments may be intentionally turned off, e.g., to change an antenna pattern. In some instances, certain sections of number of people, e.g., number of wireless users, in a particular section of the stadium may change dramatically over time, e.g., as a function of the event timing, the quality of the event, and/or other conditions. For example, a certain highly populated uncovered section of the stadium may change to become a lowly populated or vacant section due to heavy rain. The antenna patterns of the base stations and/or orientations of the base station antennas may be, and in some embodiments, are changed in response to detected changes in conditions.

Various aspects and/or features of the some embodiments of the present invention are discussed further below.

In various embodiments, a select group of sensors which do different types of measurements are integrated into a base station, e.g. an access point, and make it part of internal and external input to various other processes that influence internal and external business needs. In various embodiments, sensor based information from a base station is sent to and used by a configuration management device.

In some embodiments, a MEMS pressure sensor, that can provide high level of height accuracy with respect to sea level, is included in a base station. In various embodiments, based on measurement information from the pressure sensor, and known information about ground level height with regard to sea level, the height that the base station, e.g. access point, has been installed at relative to the ground is determined. In various embodiments, based on measurement information from the pressure sensor, and known information about ground level height with regard to sea level and known floor height information corresponding to a building, the floor of the building the base station has been installed on is determined. Thus, in some embodiments, sensor based information from a pressure sensor is used by a configuration management device to determine if the base station has been installed on the correct floor of a building, e.g., does the determined value, e.g., height above sea level, height above ground or floor level, match the value in a deployment plan value for the base station within acceptable tolerances.

In some embodiment, three angular sensors, e.g., at least precise to a degree in three planes, are included a base station and provide feedback into the circuit with reference to a spherical coordinate system.

In some embodiments, an integrated microelectronics chip including one or more accelerometers, a magnetometer and one or more gyroscopes is included in a base station for sensing orientation, location, vibration and shock, and/or movement.

In some embodiments the base station includes one of more motors, e.g., steering motors, to effect changes, e.g., changes in any plane. In some embodiments, a configuration management device uses sensor based information from sensors in a base station to control the location and/or orientation of the base station and/or base station antenna, e.g., in a closed loop control operation.

When sensors as described above, are integrated in the base station, e.g., wireless access point, small cell base station, femto cell base station, pico cell base station, WiFi base station, e.g., or into a base station antenna mast or base station antenna, e.g., passive base station antenna, information about height, location, sway, slant, tilt, etc, can be, and in some embodiments, is measured accurately without an expensive physical inspection of an installation site, e.g., either indoors or outdoors. This information can be, and in some embodiments, is made available, e.g., real time, to external databases and/or other devices, e.g., a centralized server. In some embodiments, the centralized server is a configuration management device. The centralized server can, and in some embodiments does, automatically provide correction parameters to the physical aspects of the base station, e.g., AP/small cell chassis or incorporate them into the selection of antenna patterns or transmit power, etc.

In one example, out of a very large number, e.g., 100K, base stations, e.g., access points, deployed the configuration management device can just filter the few installations that fall in the category of incorrect installation, loss, damage, change over time, construction changes, etc., without involving expensive quality checks.

In some embodiments, the measurements from the sensors included in base stations are utilized towards optimization, e.g., Wi-Fi optimization, a path toward localized and crowd sources optimization. In some embodiments, measurements from various sensors included in a base station are used to externally influence, e.g., control base station positioning, e.g., as part of network tuning, e.g. localized network tuning In some embodiments, sensors and motors, e.g., drive motors, are included in a base station, e.g., as part of a SON architecture, e.g., a WiFi SON architecture. In various embodiments, said SON architecture includes a configuration management device. For example, the configuration management device performs base station control operations including the selection of antenna patterns, beam steering, power/data rate changes, etc., which are influenced by received sensor based measurement information from the base station(s). This use of sensor based information is, in some embodiments, in addition to the beam forming and beam steering techniques that are at the baseband level, which react to the RSSI and link quality measurements performed at the chipset, e.g., Wi-Fi chipset.

While in some embodiments the configuration management device maybe, and is, implemented as a separate device from a base station, e.g., access point, in other embodiments one or more base stations, e.g., small access points, also operate as the configuration management device as well as a base station.

In some embodiments small cells, e.g., access points, share information sensor information and/or wireless load information. In one such embodiment a set of base stations that have MEMS capabilities work in a coordinated fashion with device to device communication, e.g., to optimize the configuration of base stations to maximize data throughput and/or the overall number of customer devices served in a wireless coverage area in which the base stations, e.g., access points, of the SON are located. Thus, in at least one embodiment the access points with MEMS capabilities exchanging loading and/or orientation information with one another with the cluster of base stations sharing information acting as a Self-Organizing Network (SON) in some embodiments.

The access points may, and sometimes do, communicate with one another and form a cluster of small cells/access Points (Physical group), e.g., a separate SON or cluster, based on one or more of the following: i) a traffic sensing algorithm, e.g., where access points which tend to handoff to one another or share the same users may form a SON, ii) neighbor sensing parameters, e.g., where access points may detect neighbors and form a SON or cluster; iii) service provider defined parameters or geographic defined boundaries, e.g. where small access points in a predefined geographic area or service provider specified set of access points may form a group; and/or iv) the indoor or outdoor location at which the wireless access points are located, e.g., groups of small access points at the same indoor or outdoor location may interact to form a cluster or SON.

In one such embodiment actions performed by individual access points in a cluster maybe, and sometimes are, the result of information and/or interaction with other access points in the cluster, e.g., via a backhaul or via direct access point to access point communication sometimes also referred to as peer to peer, device to device, or machine to machine (M2M) communication where the device communicate with each other directly, i.e., without going through an infrastructure element. In at least some embodiment the action: taken by an access point in a cluster may include one or more of the following: correction and/or modification of position of the base station, orientation of an antenna, etc. In addition actions may include selection of an antenna pattern or patterns to be used. In some embodiments selection of an antenna pattern to be used is based on collective information obtained from multiple participating devices e.g., access points in a cluster. In some such embodiments one of the access points in the cluster may act as a control or management device while in other embodiments access points may make individual decisions with regard to position, orientation, etc, but with the decisions being made from information provided from multiple access points, e.g., multiple access points in a cluster with MEMs capability and/or wireless load sensing and reporting capability.

In various embodiments, the configuration management device uses real time or near real time feedback mechanisms in controlling one or more base stations, e.g., controlling base station or base station antenna position, orientation and/or altitude.

An exemplary method of operating a configuration management device, comprises: receiving from a base station, at the configuration management device, sensor based information including at least of: i) a pressure sensor measurement, ii) an accelerometer measurement, iii) a height based on a pressure sensor measurement, or iv) orientation information based on an accelerator measurement; and making a configuration determination based on the received sensor based information.

In some embodiments the base station includes a transceiver coupled to an antenna, and the sensor based information includes at least some measurement information from a sensor mounted on said antenna or from a sensor mounted on an antenna mast to which said antenna is attached.

In some embodiments the base station further includes a moveable mast, and a mast drive motor. In some embodiments the antenna is coupled to said transceiver by a cable. In some embodiments the base station further includes a processor for controlling the mast drive motor in accordance with control information received from the configuration management device. In some embodiments the sensor based information further includes at least one of: magnetic sensor information or a heading direction based on the magnetic sensor information. In some embodiments the sensor based measurement information further includes at least one of: gyroscope information or a heading direction based on the gyroscope information. In some embodiments the sensor measurement based information includes measurements from three accelerometers which are substantially orthogonal. In some embodiments the sensor measurement based information includes roll, pitch, and heading angles with respect to a predetermined reference system.

In some embodiments the sensor based measurement information includes a determined position and a determined orientation. In some embodiments making a configuration determination includes: determining if the base station was mounted in accordance with at least one of a predetermined orientation, height or location.

In some embodiments making a configuration determination includes: determining if the base station was mounted in a predetermined orientation by comparing tilt information to an intended tilt included in a base station deployment plan.

In some embodiments making a configuration determination includes: comparing received GPS location information to a predetermined location in said base station deployment plan to determine if the base station was mounted at the location intended in said deployment plan. In some embodiments the received sensor based measurement information includes pressure sensor measurement information. In some embodiments making a configuration determination includes: using said received pressure sensor information to determine the height from ground level at which said base station was mounted.

In some embodiments determining if the height from ground level is different from a height in the specified plan. In some embodiments the method further comprises taking an action based on a detected difference between a predetermined orientation, height or location specified in the predetermined deployment plan. In some embodiments the action includes operating a motor in said base station to reorient an antenna included in said base station or move said base station. In some embodiments the action includes changing a set of antenna selectable antenna patterns which used by said base station.

In some embodiments changing the set of antenna selectable antenna patterns which are used by said base station includes eliminating from use a subset of base station supported antenna patterns. In some embodiments the subset of base station support antenna patters are antenna patterns which transmit energy in direction which causes interference to other base stations or are locations where users are not likely to be located as determined based on the received sensor measurement information and user location information. In some embodiments the action includes automatically deploying service personal to service said base station in response to detecting that the base station was mounted in a manner that deviates from at least one of a predetermined orientation, height or location by more than a predetermined amount and the deviation is not correctable by controlling a motor in the base station or by altering the set of antenna patterns used by said base station.

In some embodiments the method further comprises storing schedule information. In some embodiments making a configuration determination based on the received sensor based information includes: determining which of a plurality of antenna patterns is to be used based on said schedule and the orientation of the base station as indicated by the received sensor information. In some embodiments the schedule information includes information about a scheduled time of a sporting event, concert or other entertainment event. In some embodiments determining which of a plurality of antenna patterns is to be used based on said schedule and the orientation of the base station as indicated by the received sensor based information includes: determining to use a first antenna pattern during a first time period people are expected to be arriving or leaving said porting event, concert or other entertainment event, and determining to use a second antenna pattern during a second time period during which said event is to be ongoing.

In some embodiments the antenna pattern determined to be used during a given time period alters the base station coverage to take into consideration the expected location of people in the base station coverage area at different times (e.g., when people are entering or leaving an event as opposed to while they are inside the area or hall where the event is scheduled to take place). In some embodiments the method further comprises receiving information indicating a location of people in the base station coverage area. In some embodiments making a configuration determination based on the received sensor based information includes using said location information to select an antenna pattern which provides better coverage (e.g., overall data capacity for the area) in an area said information indicates a large number of people are located than at a location where a lower number of people are located.

In some embodiments the information is based on at least one of usage statics from the base station or from real time feedback information obtained from one or more other devices (e.g., pattern of data usage from other base stations may indicate a crowd is headed in a particular direction and the base station may be configured to provide coverage in the area into which the crowd is headed before the crowd reaches the coverage area).

An exemplary configuration management device in accordance with some embodiments comprises: a receiver configured to receive from a base station, at the configuration management device, sensor based information including at least of: i) a pressure sensor measurement, ii) an accelerometer measurement, iii) a height based on a pressure sensor measurement, or iv) orientation information based on an accelerator measurement; and a processor configured to make a configuration determination based on the received sensor based information. In some embodiments the processor is further configured, as part of being configured to make a configuration determination, to determine if the base station was mounted in accordance with at least one of a predetermined orientation, height or location. In some embodiments the processor is further configured, as part of being configured to make a configuration determination, to determine if the base station was mounted in a predetermined orientation by comparing tilt information to an intended tilt included in a base station deployment plan.

In some embodiments the processor is further configured, as part of being configured to make a configuration determination, to compare received GPS location information to a predetermined location in said base station deployment plan to determine if the base station was mounted at the location intended in said deployment plan.

In some embodiments the received sensor based measurement information includes pressure sensor measurement information. In some embodiments the processor is further configured, as part of being configured to make a configuration determination, to use said received pressure sensor information to determine the height from ground level at which said base station was mounted.

The techniques of various embodiments may be implemented using software, hardware and/or a combination of software and hardware. Various embodiments are directed to network devices, e.g., a configuration management device, a base station, a server, a database device, etc. Various embodiments are directed to wireless communications devices, e.g., a base station, a user wireless device, e.g., a UE device. Various embodiments are directed to communications systems, e.g., a communications system including a configuration management device and a plurality of base stations, e.g., WiFi base stations, small cell base stations, micro base stations, femto cell base stations, pico cell base stations, etc. Various embodiments are also directed to methods, e.g., a method of operating a configuration management device, a method of operating a base station, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes or devices described herein are implemented using one or more modules to perform the steps corresponding to one or more methods, for example, receiving information, making a decision, implementing a decision, signal generation, signal transmission, signal reception, signal processing, and/or other steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a configuration management device including a processor configured to implement one, multiple or all of the steps of one or more methods of the invention.

In some embodiments, the processor or processors, e.g., CPUs, of one or more devices, e.g., of a configuration management device or base station, etc. are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as device with a processor which includes a module corresponding to each of the steps of the various described methods performed by the device in which the processor is included. In some but not all embodiments an apparatus, e.g., a device includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a configuration management device. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Various features are directed to a system including multiple communications devices including, for example, a configuration management device, multiple base stations, multiple user wireless devices, e.g., multiple user equipment devices (UEs). In some embodiments the memory in a device includes data and/or control routines. In at least some embodiments one or more processors in a device operate under control instructions in the control routine or routines stored in the node's memory. Thus, when executed by the processor, the instructions in the device control the device to perform the functions in accordance with one or more of the methods described herein. In some embodiments the processor or processors of individual devices are special purposed processors, e.g., ASICs, with hardware circuitry which is configured to implement or control the device in which the special purpose processor is located to implement one or more steps in accordance with a method or methods described herein. In at least some embodiments, circuits and/or other hardware are used to implement the device or method resulting in a fully hardware implemented embodiment.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a configuration management device, comprising:
   receiving from a base station, at the configuration management device, sensor based information including a pressure sensor measurement, the pressure sensor measurement being a measurement of barometric pressure; and
   making a configuration determination based on the received sensor based information, said step of making the configuration determination including:
      comparing the received pressure sensor measurement to an expected pressure sensor measurement value to determine if the base station was mounted in accordance with a predetermined height, said expected pressure sensor measurement value being based on both height information in a base station deployment plan and atmospheric pressure information.

2. The method of claim 1, wherein making a configuration determination includes:
   determining a floor level of a building on which the base station has been installed based on the pressure sensor measurement information, known information about the height of a ground level with regard to sea level, and floor height information.

3. The method of claim 1, further comprising:
   storing schedule information; and
   wherein making a configuration determination based on the received sensor based information includes:
      determining which of a plurality of antenna patterns is to be used based on said schedule and the orientation of the base station as indicated by the received sensor information.

4. The method of claim 3,
   wherein said schedule information includes information about a scheduled time of a sporting event, concert or other entertainment event; and
   wherein determining which of a plurality of antenna patterns is to be used based on said schedule and the orientation of the base station as indicated by the received sensor based information includes:
      determining to use a first antenna pattern during a first time period people are expected to be arriving or leaving said sporting event, concert or other entertainment event; and
      determining to use a second antenna pattern during a second time period during which said event is to be ongoing.

5. The method of claim 1, further comprising
   receiving information indicating location of people in the base station coverage area; and
   wherein making a configuration determination based on the received sensor based information includes using said location information to select an antenna pattern which provides better coverage in an area said information indicates a large number of people are located than at a location where said information indicates a lower number of people are located.

6. The method of claim 5, wherein said information is based on at least one of usage statistics from the base station or from real time feedback information obtained from one or more other devices.

7. A method of operating a configuration management device, comprising:
   receiving from a base station, at the configuration management device, sensor based information including at least one of: i) a pressure sensor measurement, or ii) a height based on a pressure sensor measurement; and
   making a configuration determination based on received sensor based information, said step of making a configuration determination including:
      determining, using pressure sensor information in combination with GPS determined position information, if the base station was mounted at a predetermined height above ground level.

8. A method of operating a configuration management device, comprising:
receiving from a base station, at the configuration management device, sensor based information including a pressure sensor measurement and at least one of: i) an accelerometer measurement or ii) orientation information based on an accelerometer measurement; and
making a configuration determination based on the received sensor based information;
wherein making a configuration determination includes:
determining if the base station was mounted in accordance with at least one of a predetermined orientation, height or location; and
determining if the base station was mounted in a predetermined orientation by comparing tilt information to an intended tilt included in a base station deployment plan;
wherein said received sensor based measurement information includes pressure sensor measurement information; and
wherein making a configuration determination includes:
using said received pressure sensor information to determine the height from ground level at which said base station was mounted.

9. The method of claim 8, further comprising:
determining if the height from ground level is different from a height in the specified plan.

10. The method of claim 9, further comprising:
taking an action based on a detected difference between a predetermined orientation, height or location specified in the predetermined deployment plan.

11. The method of claim 10, wherein said action includes operating a motor in said base station to reorient an antenna included in said base station or move said base station.

12. The method of claim 10, wherein said action includes changing a set of antenna selectable antenna patterns which used by said base station.

13. The method of claim 10, wherein said action includes automatically deploying service personal to service said base station in response to detecting that the base station was mounted in a manner that deviates from at least one of a predetermined orientation, height or location by more than a predetermined amount and the deviation is not correctable by controlling a motor in the base station or by altering the set of antenna patterns used by said base station.

14. A configuration management device, comprising:
a receiver configured to receive from a base station, at the configuration management device, sensor based information including at least of: i) a pressure sensor measurement, or ii) a height based on a pressure sensor measurement; and
a processor configured to make a configuration determination based on the received sensor based information,
wherein the pressure sensor measurement is received from the base station as part of receiving sensor based information, and
wherein said processor is further configured, as part of being configured to make a configuration determination, to compare the received pressure sensor measurement to an expected pressure sensor measurement value to determine if the base station was mounted in accordance at predetermined height, said expected pressure sensor measurement value being based on both height information in a base station deployment plan and atmospheric pressure information.

15. A configuration management device, comprising:
a receiver configured to receive from a base station, at the configuration management device, sensor based information including at least of: i) a pressure sensor measurement, or ii) a height based on a pressure sensor measurement; and
a processor configured to make a configuration determination based on the received sensor based information,
wherein said processor is further configured, as part of being configured to make a configuration determination, to:
use pressure sensor information in combination with GPS determined position information to determine if the base station was mounted at a predetermined height above ground level.

16. The configuration management device of claim 15, wherein said processor is further configured, as part of being configured to make a configuration determination, to compare received GPS location information to a predetermined location in a base station deployment plan to determine if the base station was mounted at the location intended in said deployment plan.

17. The configuration management device of claim 16, wherein said base station is a cable mounted base station.

18. A non-transitory computer readable medium for use in a configuration management device, said non-transitory computer readable medium comprising:
instructions which when executed by a processor cause said processor to:
control a receiver to receive from a base station, at the configuration management device, sensor based information including at least of: i) a barometric pressure sensor measurement, or ii) a height based on a pressure sensor measurement; and
make a configuration determination based on the received sensor based information, wherein making a configuration determination includes:
determining, using pressure sensor information in combination with GPS determined position information, if the base station was mounted at a predetermined height above ground level.

* * * * *